US012720632B2

(12) United States Patent
Jia et al.

(10) Patent No.: US 12,720,632 B2
(45) Date of Patent: Aug. 25, 2026

(54) COMMUNICATION METHOD AND APPARATUS

(71) Applicant: HUAWEI TECHNOLOGIES CO., LTD., Shenzhen (CN)

(72) Inventors: Jianxin Jia, Shanghai (CN); Wenfu Wu, Shanghai (CN); Zaifeng Zong, Nanjing (CN); Fenqin Zhu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 301 days.

(21) Appl. No.: 18/506,908

(22) Filed: Nov. 10, 2023

(65) Prior Publication Data

US 2024/0080931 A1 Mar. 7, 2024

Related U.S. Application Data

(63) Continuation of application No. PCT/CN2022/088563, filed on Apr. 22, 2022.

(30) Foreign Application Priority Data

May 10, 2021 (CN) ......................... 202110508644.1

(51) Int. Cl.
*H04W 76/20* (2018.01)
*H04W 68/02* (2009.01)
*H04W 76/40* (2018.01)

(52) U.S. Cl.
CPC ........... *H04W 76/20* (2018.02); *H04W 68/02* (2013.01); *H04W 76/40* (2018.02)

(58) Field of Classification Search
CPC ...... H04W 76/20; H04W 76/40; H04W 68/02
See application file for complete search history.

(56) References Cited

U.S. PATENT DOCUMENTS

2019/0116546 A1* 4/2019 Kang .................... H04W 68/02
2019/0223250 A1* 7/2019 Dao ...................... H04W 72/23
(Continued)

FOREIGN PATENT DOCUMENTS

CN 114071376 A 2/2022

OTHER PUBLICATIONS

SA WG2 Meeting #139E S2-2003679 "KI #1, Sol #2:Solution 2 update",Ericsson,Electronic,Jun. 1-12, 2020,total 12 pages.
(Continued)

*Primary Examiner* — Ajay Cattungal

(57) ABSTRACT

Embodiments of this application relate to the field of communication technologies, and disclose a communication method and apparatus, to optimize a multicast service processing procedure. The method may include: A first session management function network element receives a first message from a second session management function network element, where the second session management function network element corresponds to a multicast session, and the first message notifies that the multicast session is activated or notifies that the multicast session is released. The first session management function network element sends first information to an access and mobility management function network element based on the first message, where the first information includes identification information of the multicast session and/or indication information indicating group paging.

20 Claims, 10 Drawing Sheets

(56) References Cited

U.S. PATENT DOCUMENTS

| | | | | |
|---|---|---|---|---|
| 2020/0045753 | A1* | 2/2020 | Dao | H04W 4/08 |
| 2020/0351984 | A1 | 11/2020 | Talebi Fard et al. | |
| 2023/0077191 | A1* | 3/2023 | Xiong | H04W 36/26 |
| 2024/0040441 | A1* | 2/2024 | Qi | H04W 36/0061 |
| 2024/0172175 | A1* | 5/2024 | Li | H04L 12/189 |

OTHER PUBLICATIONS

3rd Generation Partnership Project;Technical Specification Group Services and System Aspects;Architectural enhancements for5G multicast-broadcast services;Stage 2(Release 17),3GPP TS 23.247 V0.2.0 (Apr. 2021), total:53pages.

* cited by examiner

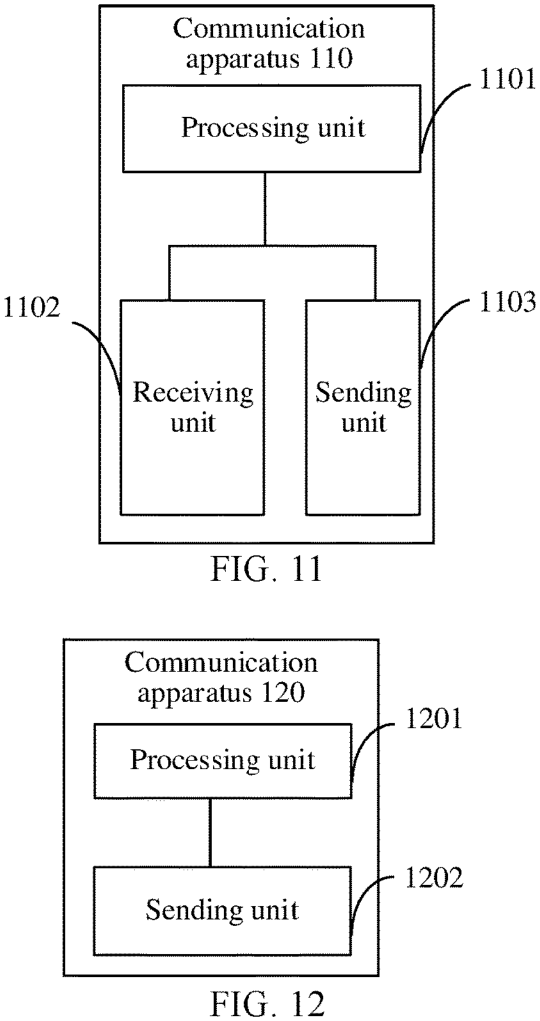
FIG. 11
FIG. 12
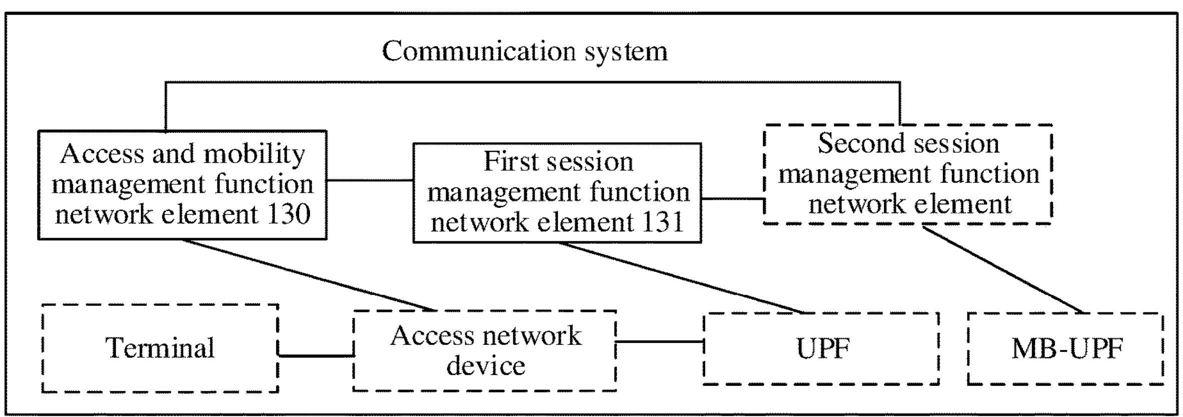
FIG. 13

COMMUNICATION METHOD AND APPARATUS

CROSS-REFERENCE TO RELATED APPLICATIONS

This application is a continuation of International Application No. PCT/CN2022/088563, filed on Apr. 22, 2022, which claims priority to Chinese Patent Application No. 202110508644.1, filed on May 10, 2021. The disclosures of the aforementioned applications are hereby incorporated by reference in their entireties.

TECHNICAL FIELD

Embodiments of this application relate to the field of communication technologies, and in particular, to a communication method and apparatus.

BACKGROUND

With development of the mobile Internet, mobile high-definition video services are experiencing a surge. Users are gradually changing from watching popular programs on fixed televisions to watching popular programs on mobile phone terminals and the mobile Internet. Video services have increasingly strong impact on mobile networks. At present, transmission of a video service may be optimized in a multicast/broadcast manner to greatly reduce impact of video traffic on a mobile network. For example, data of a video service is sent to a large quantity of users in the multicast/broadcast manner.

In many mobile communication network architectures, a 5th generation (5G) mobile communication network architecture may support a multicast/broadcast function. Data of a multicast/broadcast service is sent to a large quantity of users in a multicast/broadcast manner. In research on a 5G multicast/broadcast function, how to optimize a multicast/broadcast service management procedure is an urgent problem to be resolved.

SUMMARY

Embodiments of this application provide a communication method and apparatus, to optimize a multicast service processing procedure.

To achieve the foregoing objective, the following technical solutions are used in embodiments of this application.

According to a first aspect, an embodiment of this application provides a communication method. The method includes: A first session management function network element receives a first message that is from a second session management function network element and that notifies that a multicast session is activated or notifies that the multicast session is released, and sends first information to an access and mobility management function network element based on the first message, where the first information includes identification information of the multicast session and/or indication information, and the indication information indicates group paging. The second session management function network element corresponds to the multicast session.

Based on the method according to the first aspect, when the multicast session is activated or deactivated, the first session management function network element may send the indication information to the access and mobility management function network element, to indicate the access and mobility management function network element to page a terminal group corresponding to the multicast session, so as to optimize a paging area of a terminal corresponding to the multicast session, so that a paging message is not repeatedly sent in an overlapping area, a paging procedure is optimized, and signaling overheads caused by paging the terminal in the multicast group are reduced.

In a design, the method further includes: The first session management function network element determines, based on the first message, that a quantity of protocol data unit PDU sessions in an inactive state in one or more PDU sessions associated with the multicast session satisfies a preset condition. Based on this design, the group paging indication may be sent when the PDU session in the inactive state in the one or more PDU sessions associated with the multicast session reaches the preset condition, so as to reduce a paging signaling procedure when there are a large quantity of PDU sessions in the inactive state.

In a design, the indication information includes first indication information or second indication information, where the first indication information indicates to page, in a group paging manner, the terminal corresponding to the multicast session; or the second indication information indicates to page, in a group paging manner, a terminal corresponding to the PDU session in the inactive state. Based on this design, group paging may be performed at a granularity of a terminal, or may be performed at a granularity of a PDU session, to effectively and flexibly indicate a group paging object.

In a design, the first information is carried in N1N2 message transfer; or the first information is carried in an N11 message. Based on this design, a carrier carrying the first information is effectively and flexibly designed, and a system design is simplified.

According to a second aspect, an embodiment of this application further provides a communication method. The method includes: An access and mobility management function network element receives, from a first session management function network element, first information including identification information of a multicast session and/or indication information, where the indication information indicates group paging; and the access and mobility management function network element performs group paging based on the first information.

Based on the method according to the second aspect, when the multicast session is activated or deactivated, the access and mobility management function network element receives the indication from the first session management function network element, to page a terminal group corresponding to the multicast session, so as to optimize a paging area of a terminal corresponding to the multicast session, so that a paging message is not repeatedly sent in an overlapping area, a paging procedure is optimized, and signaling overheads caused by paging the terminal in the multicast group are reduced.

In a design, the indication information includes first indication information or second indication information, where the first indication information indicates to page, in a group paging manner, the terminal corresponding to the multicast session; or the second indication information indicates to page, in a group paging manner, a terminal corresponding to a PDU session in an inactive state. Based on this design, group paging may be performed at a granularity of a terminal, or may be performed at a granularity of a PDU session, to effectively and flexibly indicate a group paging object.

In a design, the first information is carried in N1N2 message transfer; or the first information is carried in an N11 message. Based on this design, a carrier carrying the first information is effectively and flexibly designed, and a system design is simplified.

In a design, that the access and mobility management function network element performs group paging based on the first information includes: The access and mobility management function network element determines, based on the first information, a terminal that has joined the multicast session and that is in a CM-IDLE state; and the access and mobility management function network element sends, based on the indication information, a paging message in a paging area of the terminal that has joined the multicast session and that is in the CM-IDLE state, where the paging message includes the identification information of the multicast session, and the paging area of the terminal in the CM-IDLE state includes a union set of registration areas of terminals in the CM-IDLE state.

Based on this design, the paging message is not repeatedly sent in the overlapping area, so that the signaling overheads caused by the paging are reduced.

According to a third aspect, an embodiment of this application provides a communication method. The method includes: An access and mobility management function network element receives, from a first session management function network element, a second message that is used by the access and mobility management function network element to indicate a terminal in a CM-CONNECTED state to the first session management function network element; and sends a third message to the first session management function network element based on the second message, where the third message includes identification information of a first terminal and/or identification information of a multicast session, the first session management function network element is configured to manage a protocol data unit PDU session that is in one or more PDU sessions of the first terminal and that is associated with the multicast session, and the terminal in the CM-CONNECTED state includes the first terminal.

Based on the method according to the third aspect, the first session management function network element may indicate the access and mobility management function network element to indicate the terminal in the CM-CONNECTED state to the first session management function network element, so that the first session management function network element is triggered to send, to an access network device corresponding to the first terminal, related information used for configuring a radio bearer corresponding to the multicast session, so as to ensure that the first terminal can normally receive data of a multicast service. Alternatively, the first session management function network element is triggered to indicate the access network device to release a resource used for transmitting the data of the multicast service to the first terminal, so that resource utilization is improved.

In a design, the second message includes the identification information of the multicast session. Based on this design, a terminal that has joined the multicast session and that is in the CM-CONNECTED state may be indicated to the first session management function network element at a granularity of a multicast session, to simplify a system design.

In a design, the second message further indicates the access and mobility management function network element to page a terminal in a CM-IDLE state. Based on this design, when there is a terminal in the CM-IDLE state, the terminal in the CM-IDLE state is paged, and the terminal is switched to the CM-CONNECTED state, to ensure that based on a communication interface corresponding to the terminal, the first session management function network element configures related information of a radio bearer, releases a related resource for the terminal, or the like.

In a design, that the access and mobility management function network element sends a third message to the first session management function network element based on the second message includes: The access and mobility management function network element pages, based on the second message, a terminal that has joined in the multicast session and that is in the CM-IDLE state, where the terminal in the CM-IDLE state includes the first terminal; the access and mobility management function network element receives a service request from the first terminal; and the access and mobility management function network element sends the third message to the first session management function network element.

In a design, that the access and mobility management function network element pages the terminal in the CM-IDLE state based on the second message includes: The access and mobility management function network element pages, based on the second message and multicast capability information of an access network device in a registration area of the terminal that has joined in the multicast session and that is in the CM-IDLE state, the terminal that has joined in the multicast session and that is in the CM-IDLE state.

In a design, that the access and mobility management function network element pages, based on the second message and multicast capability information of an access network device in a registration area of the terminal in the CM-IDLE state, the terminal that has joined in the multicast session and that is in the CM-IDLE state includes: If a first access network device in a registration area of the first terminal supports a multicast function, the access and mobility management function network element sends a paging message to the first access network device, where the paging message includes the identification information of the multicast session, and the terminal in the CM-IDLE state includes the first terminal; or if a second access network device in a registration area of the first terminal does not support a multicast function, the access and mobility management function network element sends a paging message to the second access network device, where the paging message includes the identification information of the first terminal.

Based on this design, for an access network device that supports the multicast function, a paging message that carries identification information of a multicast session is sent to the access network device, so that the access network device identifies the identification information of the multicast session included in the paging message, and initiates, based on the identification information of the multicast session, group paging to a plurality of terminals that have joined the multicast session and that are in the CM-IDLE state, so that signaling overheads are reduced. For an access network device that does not support the multicast function, a paging message that carries identification information of a terminal is sent to the access network device, so that the access network device initiates paging for the terminal based on the identification information of the terminal, to avoid a paging failure caused because the access network device that does not support the multicast function cannot identify identification information of a multicast session.

In a design, that the access and mobility management function network element pages the terminal in the CM-IDLE state based on the second message includes: The access and mobility management function network element sends, based on the second message, a fourth message to an access network device corresponding to the first terminal, where the fourth message includes the identification information of the first terminal and the identification information of the multicast session, and the terminal in the CM-IDLE state includes the first terminal. Based on this design, the access network device corresponding to the first terminal flexibly selects a paging manner based on multicast capability information of the access network device.

In a design, that the access and mobility management function network element sends a third message to the first session management function network element based on the second message includes: The access and mobility management function network element receives the second message; and if there is a terminal in the CM-CONNECTED state, the access and mobility management function network element sends the third message to the first session management function network element, where the terminal in the CM-CONNECTED state includes the first terminal.

Based on this design, the terminal in the CM-CONNECTED state may be directly indicated to the first session management function network element, and the terminal does not need to be paged, to simplify the system design.

According to a fourth aspect, an embodiment of this application provides a communication method. The method includes: A first session management function network element sends, to an access and mobility management function network element, a second message that is used by the access and mobility management function network element to indicate a terminal in a CM-CONNECTED state to the first session management function network element; and the first session management function network element receives a third message from the access and mobility management function network element, where the third message includes identification information of a first terminal and/or identification information of a multicast session, the first session management function network element is configured to manage a PDU session that is in one or more PDU sessions of the first terminal and that is associated with the multicast session, and the terminal in the CM-CONNECTED state includes the first terminal.

Based on the method according to the fourth aspect, the first session management function network element may indicate the access and mobility management function network element to indicate the terminal in the CM-CONNECTED state to the first session management function network element, and receive the indication from the access and mobility management function network element, so that the first session management function network element learns of a CM state of the terminal, and the first session management function network element performs subsequent work based on the CM state of the terminal.

In a design, the method further includes: The first session management function network element receives, from a second session management function network element, a first message that notifies that the multicast session is activated or notifies that the multicast session is released, where the second session management function network element corresponds to the multicast session; and that a first session management function network element sends a second message to an access and mobility management function network element includes: The first session management function network element sends the second message to the access and mobility management function network element based on the first message. Based on this design, the second message may be sent to the access and mobility management function network element in a multicast session activation scenario or a multicast session release scenario, to expand an application scenario of the method.

In a design, the second message includes the identification information of the multicast session. Based on this design, a terminal that has joined the multicast session and that is in the CM-CONNECTED state may be indicated to the first session management function network element at a granularity of a multicast session, to simplify a system design.

In a design, the second message is further used for paging a terminal that has joined in the multicast session and is in a connection management-idle CM-IDLE state, and the second message includes the identification information of the multicast session. Based on this design, when there is a terminal in the CM-IDLE state, the terminal in the CM-IDLE state is paged, and the terminal is switched to the CM-CONNECTED state, to ensure that based on a communication interface corresponding to the terminal, the first session management function network element configures related information of a radio bearer, releases a related resource for the terminal, or the like.

In a design, the method further includes: The first session management function network element sends, based on the third message, second information to an access network device corresponding to the first terminal, where the second information is used by the access network device to configure a radio bearer used for transmitting data of a multicast service to the first terminal, or the second information is used by the access network device to release a resource used for transmitting the data of the multicast service to the first terminal. The resource includes the radio bearer used for transmitting the data of the multicast service to the first terminal and/or multicast QoS information corresponding to the multicast service and/or unicast QoS information corresponding to the multicast QoS information.

Based on this design, the first session management function network element may send, to the access network device corresponding to the first terminal, related information used for configuring the radio bearer corresponding to the multicast session, to ensure that the first terminal can normally receive the data of the multicast service. Alternatively, the first session management function network element is triggered to indicate the access network device to release the resource used for transmitting the data of the multicast service to the first terminal, so that resource utilization is improved.

In a design, the second information is used by the access network device to configure the radio bearer used for transmitting the data of the multicast service to the first terminal; and the second information includes at least one of the following: the identification information of the multicast session, multicast quality of service QoS information corresponding to the multicast session, unicast QoS information corresponding to the multicast QoS information, or a unicast quality of service flow identifier QoS flow ID corresponding to a multicast quality of service flow QoS flow. Based on this design, the information used by the access network device to configure the radio bearer used for transmitting the data of the multicast service to the first terminal may be effectively and flexibly designed.

In a design, the second information is used by the access network device to release the resource used for transmitting the data of the multicast service to the first terminal, and the resource includes one or more of the radio bearer used for transmitting the data of the multicast service to the first terminal, the multicast QoS information corresponding to the multicast service, or the unicast QoS information corresponding to the multicast QoS information; and the second information includes at least one of the following: the identification information of the multicast session, a unicast QoS flow ID corresponding to a multicast QoS flow, multicast quality of service QoS information corresponding to the multicast session, unicast QoS information corresponding to the multicast QoS information, or a release indication, where the release indication indicates to release the resource used for transmitting the data of the multicast service to the first terminal. Based on this design, the information used by the access network device to release the resource used for transmitting the data of the multicast service to the first terminal may be effectively and flexibly designed.

According to a fifth aspect, an embodiment of this application provides a communication method. The method includes: An access network device determines that a multicast session corresponding to a multicast service is activated; and the access network device sends a sixth message to an access and mobility management function network element corresponding to a first terminal, where the sixth message indicates that the multicast session is activated, the sixth message includes identification information of the multicast session, and the first terminal is a terminal that has joined the multicast session.

Based on the method shown in the fifth aspect, after the access network device activates the multicast session, the access network device may notify, through the access and mobility management function network element, the first session management function network element to also activate the multicast session, to ensure consistency of states of the multicast session maintained by the network elements. In addition, a core network element does not need to notify, at a granularity of the terminal, the access network device corresponding to the terminal to add the terminal to the multicast session, to reduce signaling overheads.

In a design, the terminal that has joined the multicast session further includes a second terminal, and the method further includes: The access network device sends a seventh message to an access and mobility management function network element corresponding to the second terminal, where the seventh message indicates that the multicast session is activated, and the seventh message includes the identification information of the multicast session. Based on this design, the access network device may indicate, to the access and mobility management function network element, that the multicast session is activated, so that the access and mobility management function network element notifies the first session management function network element that the multicast session is activated, and triggers the first session management function network element to update the state of the multicast session, and the like.

In a design, the method further includes: When the access network device receives data of the multicast service from an MB-UPF, the access network device determines that the multicast session corresponding to the multicast service is activated. Based on this design, it can be learned from user plane data transmission that the multicast session corresponding to the multicast service is activated.

In a design, the method further includes: The access network device receives an eighth message from the access and mobility management function network element, where the eighth message indicates to activate the multicast session, and the eighth message includes the identification information of the multicast session; and the access network device determines, based on the eighth message, to activate the multicast session corresponding to the multicast service. Based on this design, it can be learned from the control plane signaling message that the multicast session corresponding to the multicast service is activated.

In a design, the method further includes: The access network device configures a unicast radio bearer based on unicast quality of service QoS information, where the unicast QoS information corresponds to QoS information of the multicast session, and the unicast radio bearer is used for transmitting the data of the multicast service by using a PDU session. Based on this design, the PDU session used for transmitting the data of the multicast service may be established when the multicast session is activated, to ensure normal transmission of the data of the multicast service.

In a design, the method further includes: The access network device receives a ninth message from a first session management function network element, where the ninth message includes identification information of the PDU session, and the ninth message indicates to deactivate the PDU session; and the access network device retains, based on the ninth message, the unicast QoS information that is in a context of the PDU session and that corresponds to the multicast QoS information of the multicast session. Based on this design, when the PDU session is deactivated, the unicast QoS information corresponding to the multicast QoS information of the multicast session may be retained, so that a radio bearer used for transmitting the data of the multicast service is subsequently established for the terminal based on the QoS information, to ensure normal transmission of the data of the multicast service.

In a design, the ninth message further includes the identification information of the multicast session and/or fourth indication information, the fourth indication information indicates to retain the unicast QoS information corresponding to the multicast quality of service QoS information of the multicast session, and that the access network device retains, based on the ninth message, the unicast QoS information that is in a context of the PDU session and that corresponds to the multicast quality of service QoS information of the multicast session includes: The access network device retains, based on the fourth indication information, the unicast QoS information that is in the context of the PDU session and that corresponds to the multicast quality of service QoS information of the multicast session.

In a design, that the access network device retains, based on the ninth message, the unicast QoS information that is in a context of the PDU session and that corresponds to the multicast quality of service QoS information of the multicast session includes: If the access network device determines that the PDU session is associated with the multicast session, the access network device retains the unicast QoS information that is in the context of the PDU session and that corresponds to the multicast quality of service QoS information of the multicast session.

According to a sixth aspect, an embodiment of this application provides a communication method. The method includes: An access and mobility management function network element receives, from an access network device, a sixth message indicating that a multicast session is activated, and the sixth message includes identification information of the multicast session; and the access and mobility management function network element sends a tenth message to a first session management function network element based on the sixth message, where the tenth message indicates that the multicast session is activated, and the tenth message includes the identification information of the multicast session.

Based on the method shown in the sixth aspect, after the access network device activates the multicast session, the access and mobility management function network element may notify the first session management function network element to also activate the multicast session, to ensure consistency of states of the multicast session maintained by the network elements. In addition, a core network element does not need to notify, at a granularity of the terminal, the access network device corresponding to the terminal to add the terminal to the multicast session, to reduce signaling overheads.

In a design, the method further includes: The access and mobility management function network element receives a multicast session activation notification from a second session management function network element, where the second session management function network element corresponds to the multicast session; and the access and mobility management function network element sends an eighth message to the access network device based on the multicast session activation notification, where the eighth message indicates to activate the multicast session, and the eighth message includes the identification information of the multicast session.

According to a seventh aspect, an embodiment of this application provides a communication method. The method includes: A first session management function network element receives, from an access and mobility management function network element, a tenth message indicating to that a multicast session is activated; and the first session management function network element sets a state of the multicast session to an active state based on the tenth message.

Based on the method shown in the seventh aspect, after an access network device activates the multicast session, the access network device may notify the access and mobility management function network element to notify the first session management function network element to also activate the multicast session, to ensure consistency of states of the multicast session maintained by the network elements. In addition, a core network element does not need to notify, at a granularity of a terminal, the access network device corresponding to the terminal to add the terminal to the multicast session, to reduce signaling overheads.

In a design, the method further includes: If there is a multicast-associated PDU session and a state of the PDU session is an inactive state, the first session management function network element activates the PDU session.

In a design, the method further includes: The first session management function network element determines to deactivate the PDU session; and the first session management function network element sends a ninth message to the access network device, where the ninth message includes identification information of the PDU session, and the ninth message indicates to deactivate the PDU session. Optionally, the ninth message further includes fourth indication information and/or identification information of the multicast session, and the fourth indication information indicates to retain unicast QoS information that is in a context of the PDU session and that corresponds to multicast quality of service QoS information of the multicast session.

Based on this design, when the PDU session is deactivated, the unicast QoS information corresponding to the multicast QoS information of the multicast session may be retained, so that a radio bearer used for transmitting data of a multicast service is subsequently established for the terminal based on the QoS information, to ensure normal transmission of the data of the multicast service.

According to an eighth aspect, this application provides a communication apparatus. The communication apparatus may be a first session management function network element, or a chip or a system-on-a-chip in the first session management function network element; or may be a functional module that is in the communication apparatus and that is configured to implement the method according to any one of the first aspect or the designs of the first aspect, a functional module configured to implement the method according to any one of the fourth aspect or the designs of the fourth aspect, or a functional module configured to implement the method according to any one of the seventh aspect or the designs of the seventh aspect. The communication apparatus may implement functions performed by the communication apparatus in the foregoing aspects or the designs, and the functions may be implemented by hardware executing corresponding software. The hardware or the software includes one or more modules corresponding to the functions. In a design, the communication apparatus may include a processing unit, a receiving unit, and a sending unit.

In a design, the receiving unit is configured to receive a first message from a second session management function network element, where the second session management function network element corresponds to a multicast session, and the first message notifies that the multicast session is activated or notifies that the multicast session is released.

The sending unit is configured to send first information to an access and mobility management function network element based on the first message, where the first information includes identification information of the multicast session and/or indication information, and the indication information indicates group paging.

In another design, the sending unit is configured to send a second message to an access and mobility management function network element, where the second message is used by the access and mobility management function network element to indicate, to the communication apparatus, a terminal that has joined in a multicast session and that is in a connection management-connected CM-CONNECTED state; and The receiving unit is configured to receive a third message from the access and mobility management function network element, where the third message includes identification information of a first terminal and/or identification information of a multicast session, the communication apparatus is configured to manage a protocol data unit PDU session that is in one or more PDU sessions of the first terminal and that is associated with the multicast session, and the terminal in the CM-CONNECTED state includes the first terminal.

In still another design, the receiving unit is configured to receive a tenth message from an access and mobility management function network element, where the tenth message indicates that a multicast session is activated, and the tenth message includes identification information of the multicast session; and The processing unit is configured to set a state of the multicast session to an active state based on the tenth message.

For an implementation of the communication apparatus, refer to the behavior function of the first session management function network element in the method according to any one of the first aspect or the designs of the first aspect, any one of the fourth aspect or the designs of the fourth aspect, or any one of the seventh aspect or the designs of the seventh aspect. Details are not described again.

According to a ninth aspect, a communication apparatus is provided. The communication apparatus may be a first session management function network element, or a chip or a system-on-a-chip in the first session management function network element. The communication apparatus includes one or more processors and one or more memories. The one or more memories are coupled to the one or more processors, the one or more memories are configured to store computer program code, and the computer program code includes computer instructions. When the one or more processors execute the computer instructions, the communication apparatus is enabled to perform the method according to any one of the first aspect or the designs of the first aspect, the method according to any one of the fourth aspect or the designs of the fourth aspect, or the method according to any one of the seventh aspect or the designs of the seventh aspect.

According to a tenth aspect, a computer program product including instructions is provided. When the computer program product runs on a computer, the computer is enabled to perform the method according to any one of the first aspect or the designs of the first aspect, the method according to any one of the fourth aspect or the designs of the fourth aspect, or the method according to any one of the seventh aspect or the designs of the seventh aspect.

According to an eleventh aspect, a computer-readable storage medium is provided. The computer-readable storage medium may be a readable non-volatile storage medium. The computer-readable storage medium stores instructions. When the instructions are run on a computer, the computer is enabled to perform the method according to any one of the first aspect or the designs of the first aspect, the method according to any one of the fourth aspect or the designs of the fourth aspect, or the method according to any one of the seventh aspect or the designs of the seventh aspect.

According to a twelfth aspect, this application provides a communication apparatus. The communication apparatus may be an access and mobility management function network element, or a chip or a system-on-a-chip in the access and mobility management function network element; or may be a functional module that is in the communication apparatus and that is configured to implement the method according to any one of the second aspect or the designs of the second aspect, a functional module configured to implement the method according to any one of the third aspect or the designs of the third aspect, or a functional module configured to implement the method according to any one of the sixth aspect or the designs of the sixth aspect. The communication apparatus may implement functions performed by the communication apparatus in the foregoing aspects or the designs, and the functions may be implemented by hardware executing corresponding software. The hardware or the software includes one or more modules corresponding to the functions. In a design, the communication apparatus may include a processing unit, a receiving unit, and a sending unit.

In a design, the receiving unit is configured to receive first information from a first session management function network element, where the first information includes identification information of a multicast session and/or indication information, and the indication information indicates group paging; and The processing unit is configured to perform group paging based on the first information.

In another design, the receiving unit is configured to receive a second message from a first session management function network element, where the second message is used by the access and mobility management function network element to indicate a terminal in a CM-CONNECTED state to the first session management function network element; and the sending unit is configured to send a third message to the first session management function network element based on the second message, where the third message includes identification information of a first terminal and/or identification information of a multicast session, the first session management function network element is configured to manage a protocol data unit PDU session that is in one or more PDU sessions of the first terminal and that is associated with the multicast session, and the terminal in the CM-CONNECTED state includes the first terminal.

In still another design, the receiving unit is configured to receive a sixth message from an access network device, where the sixth message indicates that a multicast session is activated, and the sixth message includes identification information of the multicast session; and the sending unit is configured to send a tenth message to a first session management function network element based on the sixth message, where the tenth message indicates that the multicast session is activated, and the tenth message includes the identification information of the multicast session.

In yet another design, the communication apparatus may include a processor and a communication interface. Optionally, the communication apparatus may further include a memory. The memory is configured to store computer-executable instructions and data that are necessary for the communication apparatus. When the communication apparatus runs, the processor executes the computer-executable instructions stored in the memory to implement the foregoing method.

For an implementation of the communication apparatus, refer to the behavior function of the access and mobility management function network element in the method according to any one of the second aspect or the designs of the second aspect, the method according to any one of the third aspect or the designs of the third aspect, or the method according to any one of the sixth aspect or the designs of the sixth aspect.

According to a thirteenth aspect, a communication apparatus is provided. The communication apparatus may be an access and mobility management function network element, or a chip or a system-on-a-chip in the access and mobility management function network element. The communication apparatus includes one or more processors and one or more memories. The one or more memories are coupled to the one or more processors, the one or more memories are configured to store computer program code, and the computer program code includes computer instructions. When the one or more processors execute the computer instructions, the communication apparatus is enabled to perform the method according to any one of the second aspect or the designs of the second aspect, the method according to any one of the third aspect or the designs of the third aspect, or the method according to any one of the sixth aspect or the designs of the sixth aspect.

According to a fourteenth aspect, a computer program product including instructions is provided. When the computer program product runs on a computer, the computer is enabled to perform the method according to any one of the second aspect or the designs of the second aspect, the method according to any one of the third aspect or the designs of the third aspect, or the method according to any one of the sixth aspect or the designs of the sixth aspect.

According to a fifteenth aspect, a computer-readable storage medium is provided. The computer-readable storage medium may be a readable non-volatile storage medium.

The computer-readable storage medium stores instructions. When the instructions are run on a computer, the computer is enabled to perform the method according to any one of the second aspect or the designs of the second aspect, the method according to any one of the third aspect or the designs of the third aspect, or the method according to any one of the sixth aspect or the designs of the sixth aspect.

According to a sixteenth aspect, this application provides a communication apparatus. The communication apparatus may be an access network device, or a chip or a system-on-a-chip in the access network device; or may be a functional module that is in the communication apparatus and that is configured to implement the method according to any one of the fifth aspect or the designs of the fifth aspect. The communication apparatus may implement functions performed by the communication apparatus in the foregoing aspects or the designs, and the functions may be implemented by hardware executing corresponding software. The hardware or the software includes one or more modules corresponding to the functions. In a design, the communication apparatus may include a processing unit, a receiving unit, and a sending unit.

The processing unit is configured to determine that a multicast session corresponding to a multicast service is activated; and the sending unit is configured to send a sixth message to an access network device corresponding to a first terminal, where the sixth message indicates that the multicast session is activated, the sixth message includes identification information of the multicast session, and the first terminal is a terminal that has joined the multicast session.

For an implementation of the communication apparatus, refer to the behavior function of the access network device in the method according to any one of the fifth aspect or the designs of the fifth aspect. Details are not described again.

According to a seventeenth aspect, a communication apparatus is provided. The communication apparatus may be an access network device, or a chip or a system-on-a-chip in the access network device. The communication apparatus includes one or more processors and one or more memories. The one or more memories are coupled to the one or more processors, and the one or more memories are configured to store computer program code. The computer program code includes computer instructions. When the one or more processors execute the computer instructions, the communication apparatus is enabled to perform the method according to any one of the fifth aspect or the designs of the fifth aspect.

According to an eighteenth aspect, a computer program product including instructions is provided. When the computer program product runs on a computer, the computer is enabled to perform the method according to any one of the fifth aspect or the designs of the fifth aspect.

According to a nineteenth aspect, a computer-readable storage medium is provided. The computer-readable storage medium may be a readable non-volatile storage medium, and the computer-readable storage medium stores instructions. When the instructions are run on a computer, the computer is enabled to perform the method according to any one of the fifth aspect or the designs of the fifth aspect.

According to a twentieth aspect, a communication system is further provided. The communication system may include the communication apparatus according to the eighth aspect and the communication apparatus according to the twelfth aspect, and may further include the communication apparatus according to the sixteenth aspect.

BRIEF DESCRIPTION OF DRAWINGS

FIG. 11 is a diagram of a communication apparatus 110 according to an embodiment of this application;

FIG. 12 is a diagram of a communication apparatus 120 according to an embodiment of this application; and FIG. 13 is a diagram of a communication system according to an embodiment of this application.

DESCRIPTION OF EMBODIMENTS

Figure 1:
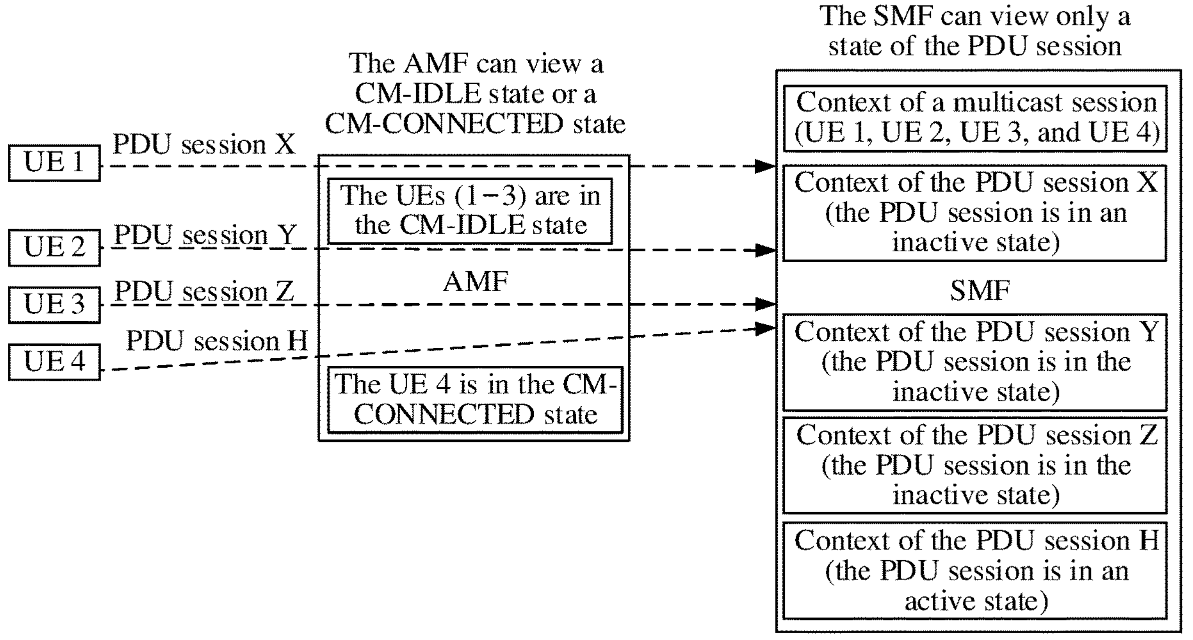
FIG. 1 is a diagram in which a terminal joins a multicast session according to an embodiment of this application.

In a communication system, when a plurality of terminals have a requirement for a multicast service, the plurality of terminals may join a multicast session, and receive data of the multicast service by using the multicast session. The multicast session may be shared by the plurality of terminals. An application server side may deliver one copy of data of the multicast service to a multicast user plane function network element (for example, a multicast broadcast-user plane function (MB-UPF)). After receiving the data of the multicast service, the MB-UPF sends the data of the multicast service to the plurality of terminals by using the multicast session. For example, after receiving the data of the multicast service, the MB-UPF sends the data of the multicast service to an access network device by using the multicast session. After receiving the data that is of the multicast service and that is transmitted by using the multicast session, the access network device sends the data of the multicast service to the plurality of terminals in a point to multipoint (PTM) manner, and does not need to send the data of the multicast service to each of the plurality of terminals in a point to point (PTP) manner, so that network resource utilization is improved.

It should be noted that, "multicast" in this application is a concept in a broad sense, and may include multicast or broadcast. In other words, embodiments of this application may be applied to both multicast service transmission and broadcast service transmission. "Multicast" mentioned in this application may be replaced with "multicast or broadcast". In addition, a multicast session in this application may be replaced with a multicast service session or a multicast broadcast service session (MBS session). This is not limited.

In embodiments of this application, that a terminal joins a multicast session may be replaced with that the terminal joins a multicast service, joins a multicast broadcast service (MB S), or the terminal joins a multicast group corresponding to the multicast session.

In embodiments of this application, the terminal may have one or more protocol data unit (PDU) sessions. The terminal may select one PDU session from the one or more PDU sessions of the terminal, and join the multicast session by using the PDU session of the terminal. The following describes a process in which the terminal joins the multicast session by using the PDU session of the terminal.

In a design, the terminal may join the multicast group by using a control plane message (for example, a PDU session establishment/modification request) of the PDU session of the terminal. The control plane message carries identification information of the multicast session, indication information for joining the multicast group, and the like. For example, the terminal may send the control plane message to a session management function network element (which may be referred to as a first session management function network element, a unicast session management function network element, or an SMF in this application) corresponding to the PDU session of the terminal. After the session management function network element corresponding to the PDU session of the terminal receives the control plane message, if the session management function network element has not received multicast quality of service (QoS) information (or referred to as QoS information corresponding to the multicast session) of the multicast service, the session management function network element extracts the multicast QoS information of the multicast service from a multicast session management function network element (which may be referred to as a second session management function network element or a multicast broadcast-session management function (MB-SMF) in this application). Further, optionally, the multicast session management function network element may interact with another network element to add the terminal to the multicast session.

In another design, the terminal may join the multicast group by using a user plane notification message (for example, the internet group management protocol/multicast listener discovery protocol (IGMP/MLD)) of the PDU session of the terminal. For example, the user plane notification message carries identification information of the multicast session and indication information for joining the multicast group. For example, the terminal may send the user plane notification message to a UPF corresponding to the PDU session of the terminal. After receiving the user plane notification message, the UPF notifies a session management function network element corresponding to the PDU session of the terminal that the terminal joins the multicast session. The session management function network element corresponding to the PDU session of the terminal receives the notification. If the session management function network element has not received multicast QoS information of the multicast service, the session management function network element extracts the multicast QoS information related to the multicast service from a multicast session management function network element. Further, optionally, the multicast session management function network element may interact with another network element to add the terminal to the multicast session.

In embodiments of this application, identification information of a multicast session may identify the multicast session. The identification information of the multicast session may include one or more of identification information of a multicast service, context information of the multicast session, address information of the multicast service, identification information of a PDU session associated with the multicast session, a service data flow (SDF) identification rule of the multicast service, packet filtering information of data of the multicast service, identification information of a multicast group corresponding to the multicast service (for example, a temporary mobile group identifier (TMGI) of the multicast group), a multicast/broadcast service session ID, a multicast broadcast service session identifier (MBS session ID), a multicast session ID, an internet protocol (IP) address of an application server (for example, an AF) that provides the data of the multicast service, a service identifier (service ID) of the multicast service, a source-specific IP multicast address, and a packet detection rule (PDR) of the multicast service. This is not limited herein. It should be understood that the PDR is a set of filters. Each filter is a 5-tuple, including a source address, a destination address, a source port number, a target port number, and a protocol number of the multicast service. The PDR is used for filtering the data of the multicast service.

In embodiments of this application, identification information of a terminal may identify the terminal. The identification information of the terminal may be a subscription permanent identifier (SUPI) of the terminal, a subscription concealed identifier (SUCI) of the terminal, a generic public subscription identifier (GPSI) of the terminal, a 5G short-temporary mobile subscriber identity (5G S-temporary mobile subscriber identity, 5G-S-TMSI) of the terminal, a 5G globally unique temporary identity (5G-GUTI) of the terminal, a permanent equipment identifier (PEI) of the terminal, an internet protocol (IP) address of the terminal, a media access control (MAC) address of the terminal, an international mobile subscriber identity (IMSI) of the terminal, or the like. It should be understood that the terminal may include but is not limited to a first terminal, a second terminal, a third terminal, and the like in the following embodiments.

In embodiments of this application, if a PDU session of the terminal is used by the terminal to join a multicast session, the PDU session may be referred to as a PDU session associated with the multicast session, and there is an association relationship between the PDU session and the multicast session. After the terminal joins the multicast session by using the PDU session of the terminal, the association relationship between the PDU session and the multicast session may be recorded in network elements such as the terminal, an access network device, and a session management function network element corresponding to the PDU session of the terminal. That there is an association relationship between the PDU session and the multicast session may include one or more of the following: (1) Identification information of the multicast session is stored in a session management context (SM context) of the PDU session. (2) Identification information of the SM context of the PDU session points to a multicast service. For example, identification information of the PDU session may include an identifier (ID) of the SM context of the PDU session, and the ID of the SM context of the PDU session is stored in correspondence with the identification information of the multicast session. (3) The identification information of the PDU session associated with the multicast session or identification information of the terminal that has joined the multicast session is stored in a context of the multicast service (for example, a multicast broadcast service session context (MBS session context), a multicast broadcast group context (MBS group context), a multicast broadcast service context (MBS service context), or a multicast broadcast context (MBS context)).

In embodiments of this application, the session management function network element corresponding to the PDU session of the terminal may be a session management function network element that establishes, manages, and maintains (for example, modifies or releases) the PDU session of the terminal. For example, the session management function network element corresponding to the PDU session of the terminal is the first session management function network element. The first session management function network element may manage/store/set a state of the PDU session of the terminal. For example, the first session management function network element may record the state of the PDU session of the terminal in an information element in the session management context (SM context) of the PDU session of the terminal. The information element may be upCnxState=DEACTIVATED/ACTIVATED. The state of the PDU session of the terminal may be replaced with a user plane state of the PDU session of the terminal, or the like. The state of the PDU session of the terminal may include an active (activate, or activated) state, or an inactive (deactivate, inactive, or deactivated) state. If the PDU session is in the inactive state, an N3 tunnel and/or a data radio bearer (DRB) (or referred to as a radio bearer (RB) resource) that correspond/corresponds to the PDU session are/is released/unavailable. If the PDU session is in the active state, the N3 tunnel and the DRB resource that correspond to the PDU session exist or are available.

In embodiments of this application, one PDU session of a terminal may correspond to one session management function network element, and is managed by the session management function network element. Different PDU sessions of the terminal may correspond to different session management function network elements, or may correspond to a same session management function network element. PDU sessions of different terminals may correspond to a same session management function network element. When all PDU sessions of a terminal are in the inactive state, it indicates that the terminal may currently have no service data transmission, and the terminal may enter a connection management-idle (CM-IDLE) state. After the terminal enters the CM-IDLE state, a NAS signaling connection between the terminal and an access and mobility management function network element is disconnected, and the terminal cannot send NAS signaling to the access and mobility management function network element. Provided that there is a PDU session in the active state in the PDU sessions of the terminal, it indicates that the terminal still needs to transmit service data by using the PDU session, and the terminal may be in a connection management-connected (CM-connected) state. When a terminal is in the CM-IDLE state, if the terminal is a terminal that has joined a multicast session, and the terminal in the CM-IDLE state is not paged after the multicast session is activated, reception of data of a multicast service by the terminal in the CM-IDLE state is affected. To prevent the reception of the data of the multicast service by the terminal from being affected, the terminal may be switched from the CM-IDLE state to the connection management-connected (CM-connected) state, and a NAS signaling connection may be established between the terminal and the access and mobility management function network element. Then, a first session management function network element notifies an access network device to add the terminal to the multicast session, to ensure that the terminal receives the data of the multicast service by using the multicast session.

The access and mobility management function network element corresponding to the terminal may be an access and mobility management function network element that can provide a NAS signaling service for the terminal. A CM state of the terminal may be maintained by the access and mobility management function network element corresponding to the terminal. For example, the CM state of the terminal may be stored in a context of the terminal (for example, a user equipment context (UE context)) in the access and mobility management function network element. Other network element s cannot perceive or maintain the CM state of the terminal. For example, when a session management function network element corresponding to a PDU session of the terminal determines that the PDU session is in the inactive state, the session management function network element can learn of only the state of the PDU session, but cannot determine whether the CM state of the terminal is the CM-IDLE state or the CM-CONNECTED state.

It can be learned from the foregoing descriptions that, for a PDU session of the terminal, if the terminal may join a multicast session by using the PDU session, the PDU session of the terminal is associated with the multicast session. When the PDU session of the terminal is in the inactive state, the CM state of the terminal may be the CM-IDLE state or the CM-CONNECTED state. When the PDU session of the terminal is in the active state, the CM state of the terminal is the CM-CONNECTED state.

For example, UE 1 to UE 4 join a same multicast session. As shown in FIG. 1, the UE 1 joins the multicast session by using a PDU session X of the UE 1, the UE 2 joins the multicast session by using a PDU session Y of the UE 2, the UE 3 joins the multicast session by using a PDU session Z of the UE 3, and the UE 4 joins the multicast session by using a PDU session H of the UE 4, where the PDU sessions correspond to a same session management function network element. In this case, as shown in FIG. 1, from the perspective of the session management function network element, the session management function network element stores an association relationship between the multicast session and the PDU sessions, and the association relationship includes that a context of a multicast service includes the UE 1, the UE 2, the UE 3, and the UE 4. In addition, the session management function network element maintains states of the PDU session X, the PDU session Y, the PDU session Z, and the PDU session H. For example, the state of the PDU session X in an SM context of the PDU session X is an inactive state, the state of the PDU session Yin an SM context of the PDU session Y is the inactive state, the state of the PDU session Z in an SM context of the PDU session Z is the inactive state, and the state of the PDU session H in an SM context of the PDU session H is an active state. In addition, from the perspective of an access and mobility management function network element, the UE 1 to the UE 3 are in a CM-IDLE state, and the UE 4 is in a CM-CONNECTED state. That is, it can be learned from FIG. 1 that the PDU session X, the PDU session Y, and the PDU session Z are in the inactive state, the UE 1, the UE 2, and the UE 3 corresponding to the PDU session X, the PDU session Y, and the PDU session Z are in the CM-IDLE state, the PDU session H is in the active state, and the UE 4 corresponding to the PDU session H is in the CM-CONNECTED state.

It is assumed that a session management function network element corresponding to a PDU session of a terminal is a first session management function network element, the terminal joins a multicast session by using a first PDU session of the terminal, the first PDU session is in an inactive state, and the terminal may be in a CM-IDLE state or a CM-CONNECTED state. For example, when the multicast session is activated, when the terminal has a requirement for receiving data of a multicast service by using the multicast session, to ensure that the terminal can normally receive the data of the multicast service, the first session management function network element may trigger an access and mobility management function network element to page the terminal that has joined the multicast session and that is in the CM-IDLE state back to the CM-CONNECTED state. For another example, for the terminal that has joined the multicast session, when the multicast session is released, a context of the terminal in the access and mobility management function network element or related information of the multicast session in a context of the PDU session that is of the terminal and that is associated with the multicast session needs to be released. However, for the terminal that has joined the multicast session and that is in the CM-IDLE state, because the terminal has no NAS signaling connection to the access and mobility management function network element, neither the access and mobility management function network element nor the first session management function network element can perform N2 interface communication with the terminal. Therefore, the terminal that has joined the multicast session and that is in the CM-IDLE state needs to be paged back to the CM-CONNECTED state, so that the information related to the multicast session can be further released through N2 interface communication.

In embodiments of this application, that the first session management function network element triggers an access and mobility management function network element to page the terminal that has joined the multicast session and that is in the CM-IDLE state back to the CM-CONNECTED state may include: When the multicast session is activated or the multicast session is released, if there is a PDU session in the inactive state in the PDU session associated with the multicast session, the first session management function network element sends an indication to the access and mobility management function network element at a granularity of a PDU session, to indicate the access and mobility management function network element to page the terminal that has joined the multicast session and that is in the CM-IDLE state back to the CM-CONNECTED state. In this case, if there are a large quantity of PDU sessions that are associated with the multicast session and that are in the inactive state, the access and mobility management function network element needs to perform a process of paging the terminal in the CM-IDLE state back to the CM-CONNECTED state for a plurality of times. Consequently, signaling overheads are increased. Therefore, for a terminal that has joined a multicast session and that is in a CM-IDLE state, how to optimize signaling when the multicast session is activated (re-activated) or the multicast session is released is an urgent problem to be resolved.

To optimize a signaling procedure of paging a terminal in a CM-IDLE state during multicast session activation or multicast session release, an embodiment of this application provides a communication method. The method may include: A first session management function network element receives a first message (for example, multicast broadcast service session activation (MBS session activation or session activation), multicast session activation, multicast broadcast service session release (MBS session release), session release, or multicast session release) from a second session management function network element, where the first message may notify that a multicast session is activated/notify that there is to-be-sent data of a multicast service/notify that the data of the multicast service has arrived/indicate that the multicast session is activated/indicate that the multicast session needs to be reactivated, or the first message notifies that the multicast session is released. The first session management function network element sends first information to an access and mobility management function network element, where the first information includes identification information of the multicast session and/or indication information, and the indication information may indicate group paging. The access and mobility management function network element receives the first information, and pages, based on the identification information of the multicast session and the indication information, a terminal group in a CM-IDLE state in a multicast group corresponding to the multicast session, for example, uses a union set (excluding an overlapping area) of registration areas of terminals in the CM-IDLE state as a group paging area, and sends, in the group paging area, a paging message including the identification information of the multicast session, to ensure that one time of paging is performed on the plurality of terminals in the CM-IDLE state in the multicast group, so as to reduce signaling overheads during the paging.

The following describes the technical solutions in embodiments of this application with reference to the accompanying drawings in embodiments of this application.

Figure 2:
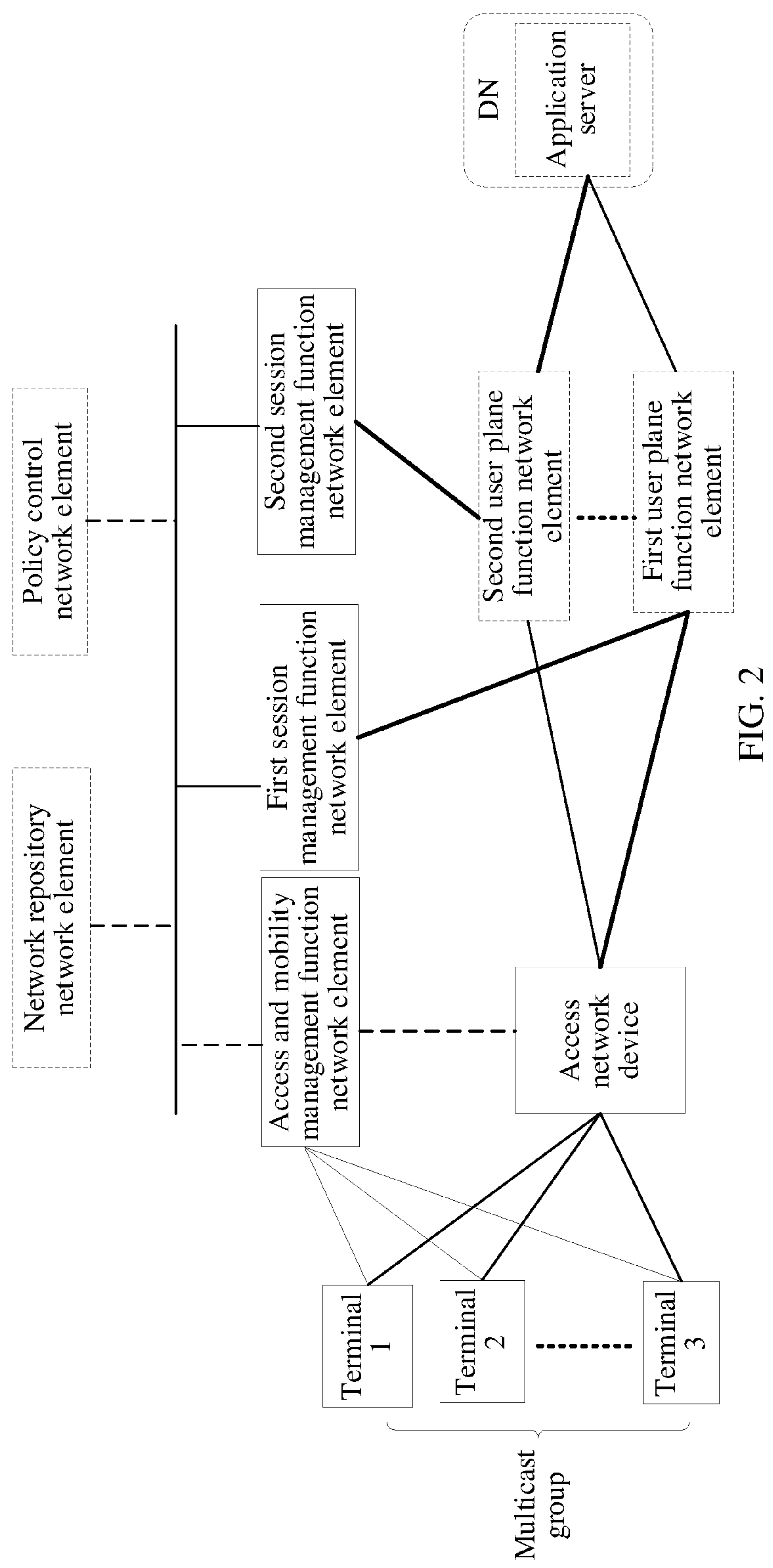
FIG. 2 is a diagram of an architecture of a communication system according to an embodiment of this application.

The communication method provided in embodiments of this application may be applied to a communication system shown in FIG. 2. As shown in FIG. 2, the communication system may include a plurality of terminals (such as a first terminal), an access network device, an access and mobility management function network element, a second session management function network element, and a first session management function network element. Further, the communication system shown in FIG. 2 may further include a first user plane function network element, a second user plane function network element, a policy control network element, a network repository network element, and a data network (DN). The DN may include an application server (AS) and the like. The first user plane function network element, the second session management function network element, the second user plane function network element, and the DN are optional network elements in this application.

The plurality of terminals may form a multicast group, and the plurality of terminals may simultaneously receive same data, namely, data of a multicast service. The first user plane function network element may be configured to transmit unicast data, or may be configured to transmit the data of the multicast service. The second user plane function network element may be configured to transmit the data of the multicast service (multicast data). The unicast data may be data sent to a specific terminal or user, and the data of the multicast service may be data sent to the multicast group. The first session management function network element may be a session management function network element for managing a PDU, and may be referred to as a unicast session management function network element. The second session management function network element may be a session management function network element for managing the multicast service, and may be referred to as a multicast session management function network element. The following describes network elements or devices in the architecture shown in FIG. 2.

The terminal may be referred to as a terminal device, user equipment (UE), a mobile station (MS), a mobile terminal (MT), or the like. The terminal in FIG. 1 may be a mobile phone, a tablet computer, or a computer having a wireless transceiver function; or may be a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in a smart city, a smart home, a vehicle-mounted terminal, or the like.

The access network device is mainly configured to implement functions such as a physical layer function, resource scheduling and management, and access control and mobility management of the terminal. The access network device may be a device supporting wired access, or may be a device supporting wireless access. For example, the access network device may be an access network (AN)/a radio access network (RAN), where the AN/RAN includes a plurality of 5G-AN/5G-RAN nodes. The 5G-AN/5G-RAN node may be an access point (AP), a NodeB (NB), an enhanced NodeB (eNB), a next-generation NodeB (NR NodeB, gNB), a transmission reception point (TRP), a transmission point (TP), another access node, or the like.

The access and mobility management function network element is mainly responsible for access authentication and mobility management of the terminal, signaling exchange between functional network elements, and the like, such as management of a registration state of a user, a connection state of a user, user registration and network access, tracking area update, user authentication during cell handover, and key security.

The session management function network element is mainly configured to implement a user plane transmission logical channel, for example, a session management function such as establishment, release, and change of a packet data unit (PDU) session or a multicast session.

The user plane function network element may be used as an anchor on the user plane transmission logical channel, and is configured to complete functions such as routing and forwarding of user plane data. For example, the user plane function network element establishes a channel (namely, the user plane transmission logical channel) between the user plane function network element and the terminal, forwards a data packet between the terminal and the DN on the channel, and is responsible for data packet filtering, data forwarding, rate control, and generation of charging information for the terminal.

The policy control network element may be configured to provide a policy, for example, a quality of service policy or a slice selection policy, for the access and mobility management function network element and the session management function network element.

The network repository network element may be configured to store user data such as subscription information and authentication or authorization data of a user. The network repository network element may be a unified data management (UDM) network element, a network repository function (NRF), a unified data repository (UDR), or the like.

The DN may be an operator network that provides a data transmission service for a user, for example, may be an operator network that provides an IP multimedia service (IMS) for the user. An application server (or referred to as an application function (AF)) may be deployed in the DN, and the application server may provide a data transmission service for a user.

It should be noted that FIG. 2 is merely an example architectural diagram. In addition to the functional units shown in FIG. 2, the system may further include another functional network element, for example, an operation and management (O&M) network element. This is not limited in embodiments of this application. In addition, names of the devices in FIG. 2 are not limited. In addition to the names shown in FIG. 2, the devices may also have other names. For example, the names may be replaced with names of network elements having same or similar functions. This is not limited.

The system shown in FIG. 2 may be a 3rd generation partnership project (3GPP) communication system, for example, a 4th generation (4G) communication system, a long term evolution (LTE) system, a 5th generation (5G) communication system, a new radio (NR) system, a next generation communication system, or a non-3GPP communication system. This is not limited.

Figure 3A:
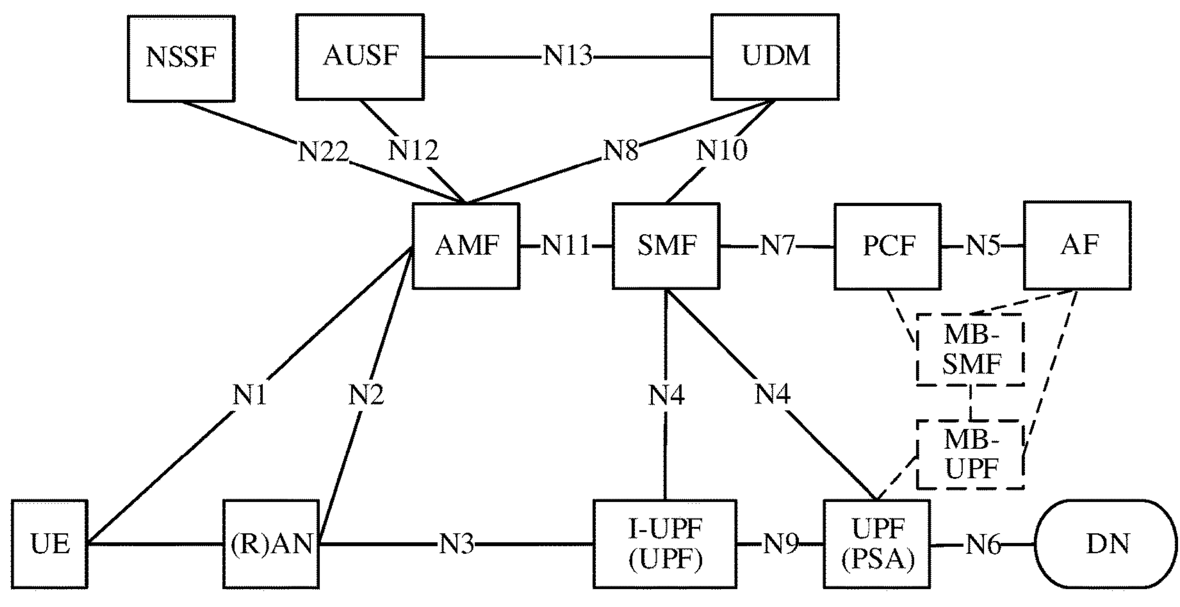
FIG. 3*a* is a diagram of an architecture of a 5G communication system according to an embodiment of this application.

For example, the communication system shown in FIG. 2 is a 5G communication system shown in FIG. 3*a*. As shown in FIG. 3*a*, a network element or an entity corresponding to the first session management function network element may be a session management function (SMF) in the 5G communication system, a network element or an entity corresponding to the second session management function network element may be a multicast broadcast session management function (MB-SMF) in the 5G communication system, and a network element or an entity corresponding to the second user plane function network element may be a user plane function (MB-UPF) in the 5G communication system. A network element or an entity corresponding to the access network device may be a radio access network (RAN) in the 5G communication system. A network element or an entity corresponding to the access and mobility management function network element may be an access and mobility management function (AMF) in the 5G communication system. A policy control function may be a policy control function (PCF) in the 5G communication system.

It should be noted that, in this application, the SMF and the MB-SMF may be co-deployed, or may be separately deployed. This is not limited. In this application, a UPF and the MB-UPF may be co-deployed, or may be separately deployed. This is not limited.

Figure 3B:
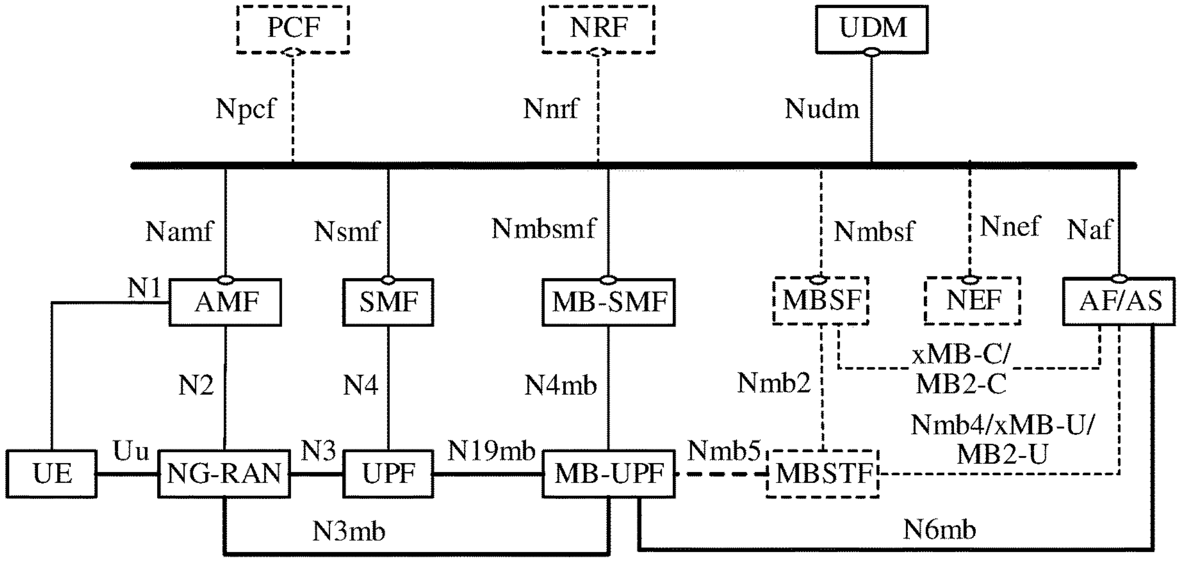
FIG. 3*b* is a diagram of another 5G communication system architecture according to an embodiment of this application.

For example, the communication system shown in FIG. 2 is a 5G communication system shown in FIG. 3*b*. Different from the system shown in FIG. 3*a*, the system shown in FIG. 3*b* may further include a multicast broadcast service transport function (MBSTF) and a multicast broadcast service function (multicast broadcast MBSF). The MBSTF may have a function of the UPF, and is configured to transmit data of a multicast service. The MBSF may have a function of the MB-SMF, for example, establishing/managing a multicast session corresponding to the multicast service. The MBSF may further support interworking with an MBMS in LTE, and the like.

Figure 3C:
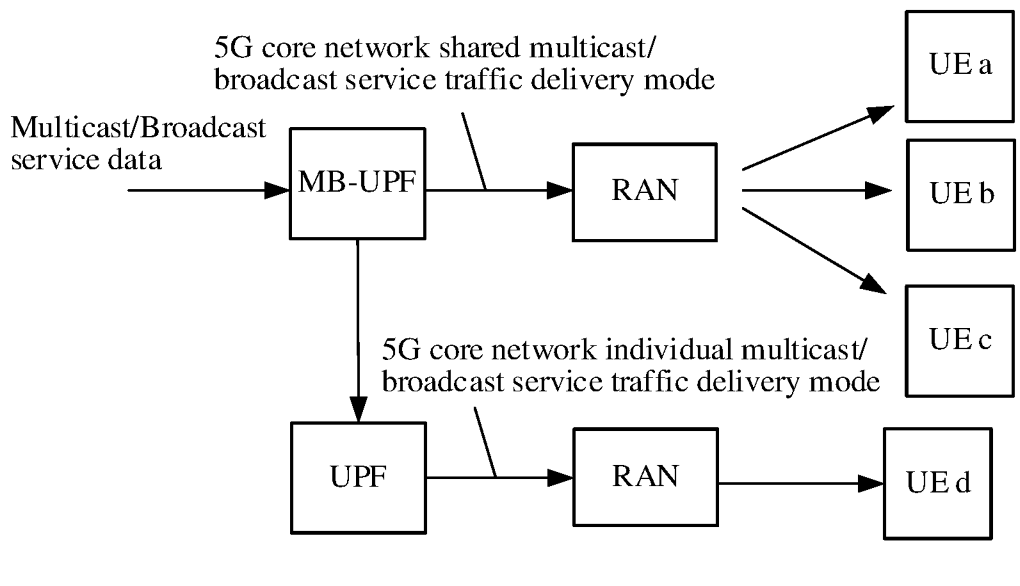
FIG. 3*c* is a diagram of a multicast/broadcast service transmission manner according to an embodiment of this application.

In embodiments of this application, when an access network device does not support a multicast function, data of a multicast service may be transmitted between the access network device and a user plane network element in a 5G core network individual multicast/broadcast service traffic delivery manner. When an access network device supports a multicast function, data of a multicast service may be transmitted in a 5G core network shared multicast broadcast service traffic delivery (5GC shared MBS traffic delivery)

manner. For example, as shown in FIG. 3*c*, in a 5GC shared MBS traffic delivery manner, data of a multicast service directly reaches a RAN through an MB-UPF and an N3 tunnel between the MB-UPF and the RAN, and the RAN may send, in a point to point (PTP) or point to multipoint (PTM) manner, the data of the multicast service to a terminal that has joined the multicast session. In a 5G core network individual multicast/broadcast service traffic delivery manner, data of a multicast service is transmitted to a UPF through an MB-UPF and then to a RAN through an N3 tunnel (for example, a PDU session of a terminal) between the UPF and the RAN. The RAN sends the data to the terminal in a point to point manner.

That the access network device does not support the multicast function may be understood as that the access network device does not support multicast service data transmission in the 5G core network shared multicast/broadcast service traffic delivery (5GC shared MBS traffic delivery) manner. In other words, the access network device supports only multicast service data transmission in the 5G core network individual multicast/broadcast service traffic delivery (5GC Individual MBS traffic delivery) manner. The data of the multicast service is sent to the terminal by using an associated PDU session of the terminal that has joined the multicast session.

It should be understood that, after reaching the access network device (for example, the RAN), the data of the multicast service is processed at a service data adaptation protocol (SDAP) layer, a packet data convergence protocol (PDCP) layer, a radio link control (RLC) layer, a media access control (MAC) layer, and a physical (PHY) layer of the RAN, and then is sent to each terminal that is to receive the data of the multicast service.

It should be noted that, in this application, the SMF and the MB-SMF may be co-deployed, or may be separately deployed. This is not limited. In this application, the UPF and the MB-UPF may be co-deployed, or may be separately deployed. This is not limited.

Optionally, each of the session management function network element, the access network device, and the access and mobility management function network element in embodiments of this application each may also be referred to as a communication apparatus, and may be a general-purpose device or a dedicated device. This is not limited in embodiments of this application. Optionally, related functions of the session management function network element, the user plane function network element, the access network device, and the access and mobility management function network element in embodiments of this application may be implemented by one device, may be jointly implemented by a plurality of devices, or may be implemented by one or more functional modules in one device. This is not limited in embodiments of this application. It may be understood that the foregoing function may be a network element in a hardware device, may be a software function running on dedicated hardware, a combination of hardware and software, or a virtualization function instantiated on a platform (for example, a cloud platform).

Figure 4:
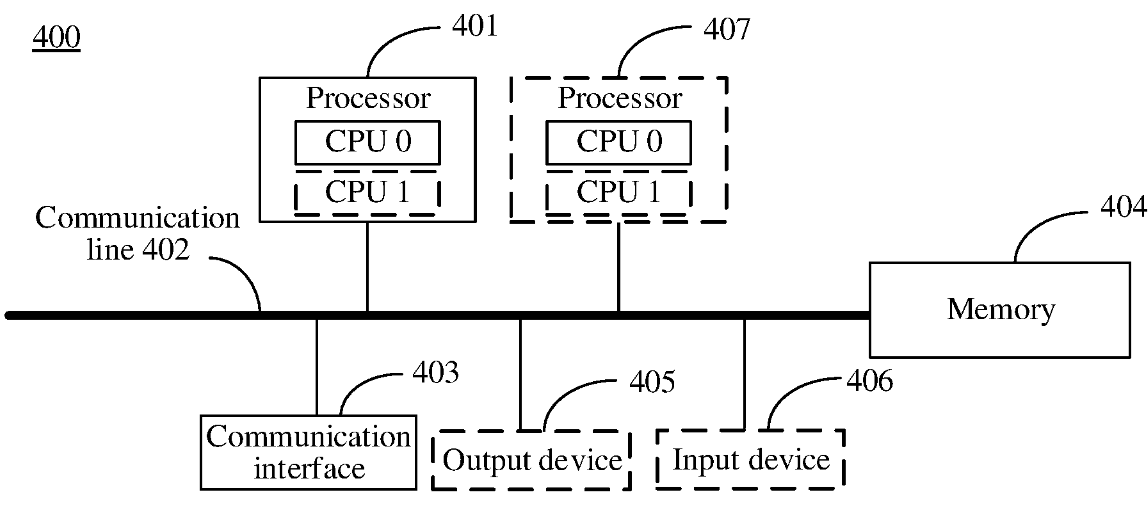
FIG. 4 is a diagram of a communication apparatus 400 according to an embodiment of this application.

During implementation, the devices shown in FIG. 2, such as the first session management function network element and the access and mobility management function network element, may use a structure shown in FIG. 4, or include components shown in FIG. 4. FIG. 4 is a diagram of a communication apparatus 400 according to an embodiment of this application. The communication apparatus 400 may include a processor 401 and a memory 404. Further, the communication apparatus 400 may further include a communication line 402 and a communication interface 403. The processor 401, the memory 404, and the communication interface 403 may be connected to each other through the communication line 402.

The processor 401 may be a central processing unit (CPU), a general-purpose processor, a network processor (NP), a digital signal processor (DSP), a microprocessor, a microcontroller, a programmable logic device (PLD), or any combination thereof. The processor 401 may alternatively be another apparatus having a processing function, for example, a circuit, a component, or a software module. This is not limited.

The communication line 402 is configured to transmit information between the components included in the communication apparatus 400.

The communication interface 403 is configured to communicate with another device or another communication network. The another communication network may be an ethernet, a radio access network (RAN), a wireless local area network (WLAN), or the like. The communication interface 403 may be a module, a circuit, a transceiver, or any apparatus that can implement communication.

The memory 404 is configured to store instructions. The instructions may be a computer program.

The memory 404 may be a read-only memory (ROM) or another type of static storage device that can store static information and/or instructions; may be a random access memory (RAM) or another type of dynamic storage device that can store information and/or instructions; or may be an electrically erasable programmable read-only memory (EEPROM), a compact disc read-only memory (CD-ROM) or another compact disc storage, optical disc storage (including a compressed optical disc, a laser disc, an optical disc, a digital universal optical disc, and a Blu-ray optical disc), a magnetic disk storage medium, or another magnetic storage device. This is not limited.

It should be noted that the memory 404 may exist independently of the processor 401, or may be integrated into the processor 401. The memory 404 may be configured to store instructions, program code, some data, or the like. The memory 404 may be located inside the communication apparatus 400, or may be located outside the communication apparatus 400. This is not limited.

The processor 401 is configured to execute the instructions stored in the memory 404, to implement the communication method provided in the following embodiments of this application. For example, when the communication apparatus 400 is a first session management function network element, or a chip or a system-on-a-chip in the first session management function network element, the processor 401 executes the instructions stored in the memory 404, to implement steps performed by a first session management function network element in the following embodiments of this application. For another example, when the communication apparatus 400 is an access network device, or a chip or a system-on-a-chip in the access network device, the processor 401 may execute the instructions stored in the memory 404, to implement steps performed by an access network device in the following embodiments of this application.

In an example, the processor 401 may include one or more CPUs, for example, a CPU 0 and a CPU 1 in FIG. 4.

In an optional implementation, the communication apparatus 400 includes a plurality of processors. For example, the communication apparatus 400 may further include a processor 407 in addition to the processor 401 in FIG. 4.

In an optional implementation, the communication apparatus 400 further includes an output device 405 and an input device 406. For example, the input device 406 is a device such as a keyboard, a mouse, a microphone, or a joystick, and the output device 405 is a device such as a display screen or a speaker.

It should be noted that the communication apparatus 400 may be a desktop computer, a portable computer, a network server, a mobile phone, a tablet computer, a wireless terminal, an embedded device, a chip system, or a device having a structure similar to that in FIG. 4. In addition, the structure shown in FIG. 4 does not constitute a limitation on the communication apparatus. In addition to the components shown in FIG. 4, the communication apparatus may include more or fewer components than those shown in the figure, or some components may be combined, or different component arrangements may be used.

In this embodiment of this application, the chip system may include a chip; or may include a chip and another discrete component.

The following describes the communication method provided in embodiments of this application with reference to the communication system shown in FIG. 2. Network elements in the following embodiments may have the components shown in FIG. 4. Details are not described again. It should be noted that actions, terms, and the like in embodiments of this application may be mutually referenced. This is not limited. In embodiments of this application, names of messages exchanged between devices, names of parameters in the messages, or the like are merely examples. Other names may alternatively be used during implementation. This is not limited. For example, multicast in embodiments of this application may be replaced with a term such as broadcast, groupcast, groupcast communication, multicast/broadcast, or groupcast/broadcast. "Determining" in embodiments of this application may also be understood as creating or generating, and "including" in embodiments of this application may also be understood as "carrying" or "containing". This is uniformly described herein. This is not limited in this embodiment of this application.

Figure 5:
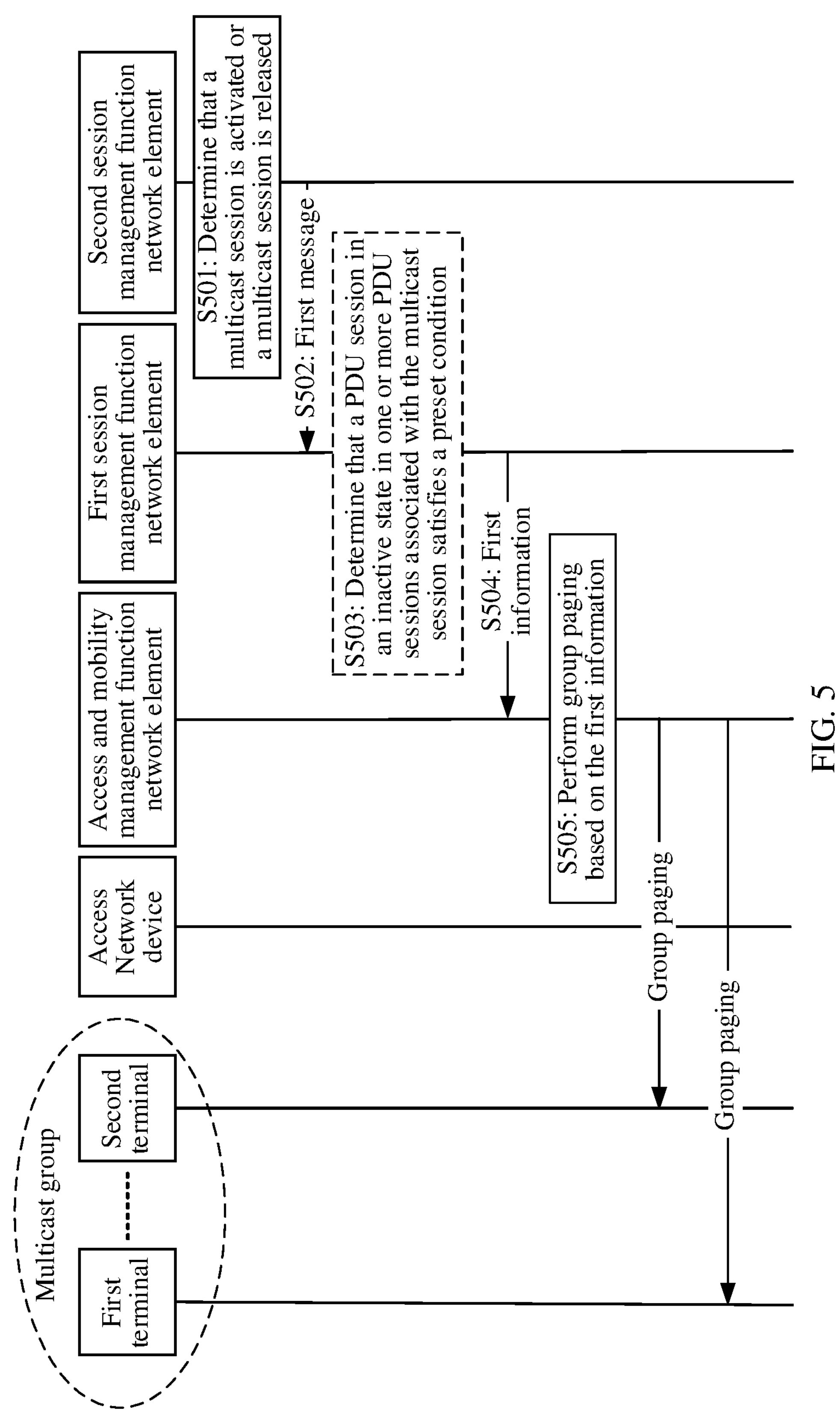
FIG. 5 is a flowchart of a communication method according to an embodiment of this application.

FIG. 5 shows a communication method according to an embodiment of this application. The method may be used for optimizing a procedure of paging a terminal that has joined a multicast session during multicast session activation or multicast session release. As shown in FIG. 5, the method may include the following steps.

S501: A second session management function network element determines that a multicast session is activated or determines to activate a multicast session; or a second session management function network element determines that a multicast session is released or determines to release a multicast session.

The second session management function network element may be the second session management function network element in FIG. 2, or the MB-SMF in FIG. 3*a* or FIG. 3*b*. The second session management function network element may correspond to the multicast session. The second session management function network element may manage the multicast session. For example, the second session management function network element may establish, modify, update, or release the multicast session. The second session management function network element may further store multicast QoS information (or referred to as QoS information related to a multicast service) corresponding to the multicast session, store a context of the multicast session, or the like.

In this embodiment of this application, the multicast session may be a transmission channel used for transmitting data of the multicast service, and the multicast session includes a transmission tunnel from an MB-UPF to an access network device. When determining that the multicast session is activated or determining to activate the multicast session in S501, the multicast session is in an inactive state. For example, a state of the multicast session in a multicast session context of the second session management function network element is the inactive state. When determining that the multicast session is released or determining to release the multicast session in S501, the multicast session may be in an active state or the inactive state.

In this embodiment of this application, the multicast service may be a type of service oriented to a multicast group or a plurality of terminals. Data of the multicast service may be received by a group of terminals, and the terminals are authorized to receive the data. For example, the multicast service may be a command sent by a same command center to a vehicle fleet, or a television program to a plurality of audiences.

In this embodiment of this application, that the multicast session is activated or the multicast session needs to be activated may be replaced with that the data of the multicast service has arrived, that there is to-be-sent data of the multicast service, or that a resource of the multicast session needs to be activated. That the multicast session is released or the multicast session needs to be released may be replaced with that the multicast service needs to be released, or the like.

For example, when the second session management function network element receives a multicast broadcast session activation (MBS session activation, session activation, or multicast session activation) notification from an AF/AS, an MBSF, or an NEF, the second session management function network element determines that the multicast session is activated. Alternatively, the MB-UPF detects arrival of the data of the multicast service, the MB-UPF notifies the second session management function network element that the multicast session is activated, and the second session management function network element receives the notification from the MB-UPF, and determines that the multicast session is activated.

For example, when the second session management function network element receives a multicast broadcast session release (MBS session release, session release, or multicast session release) notification from the AF/AS, the MB SF, or the NEF, the second session management function network element determines that the multicast session needs to be released. Alternatively, after determining to removal of a multicast session configuration (removal of MBS session configuration), the second session management function network element determines that the multicast session is released.

S502: The second session management function network element sends a first message to a first session management function network element. Correspondingly, the first session management function network element receives the first message from the second session management function network element.

The first session management function network element may be an SMF corresponding to a PDU session of a terminal, and the PDU session of the terminal is associated with the multicast session. In other words, the first session management function network element may be a session management function network element that manages (establishes, modifies, or releases) the PDU session associated with the multicast session, and the first session management function network element may store a context of the PDU session, and the like. The terminal corresponding to the PDU session may be a terminal that has joined the multicast session, and a user using the terminal may be a member in a multicast group corresponding to the multicast session.

The first message may notify that the multicast session is activated, notify that there is to-be-sent data of the multicast service, notify that the data of the multicast service has arrived, indicate that the multicast session is activated, indicate that the multicast session needs to be reactivated, or indicate/notify to reactivate the multicast session, or the like. The first message may include identification information of the multicast session. The first message may be an N16mb message. The first message may be a multicast session activation request, for example, a multicast broadcast service activation request (MBS activation request); or a multicast session activation notification, for example, a multicast broadcast service activation notification (MBS session activation notification), a multicast broadcast service session activation (MBS session activation), session activation, or multicast session activation. The first message may directly indicate/notify to activate the multicast session. For example, the first message may carry an information element/indication/notification, where the information element/indication/notification indicates to activate the multicast session. For another example, the first message may indirectly indicate to activate the multicast session. For example, the first message may indicate/notify that the multicast session is initiated/started, and the first message is MBS session start/session start, multicast broadcast service session activation (MBS session activation), multicast session activation, or session activation; or the first message indicates that the MB-UPF detects the data of the multicast service, that the data of the multicast service arrives at the MB-UPF, that the data of the multicast service is to be transmitted, that there is to-be-transmitted data of the multicast service, or the like.

Alternatively, the first message may notify that the multicast session is released, or indicate/notify to release the multicast session, or the like. The first message may include identification information of the multicast session. The first message may be an N16mb message. The first message may be a multicast session release request (MBS session release request), a multicast session release (MBS session release) notification, session release, or multicast session release.

For example, the second session management function network element may send the first message to the first session management function network element based on identification information of the first session management function network element. Alternatively, when extracting the multicast QoS information corresponding to the multicast session from the second session management function network element, the first session management function network element sends, to the second session management function network element, a subscription request that carries the identification information of the multicast session, to request to subscribe to a notification of multicast session activation (for example, a MBS session activation notification, MBS session activation, session activation, or multicast session activation); or request to subscribe to a multicast session release (for example, multicast broadcast session release (MBS session release), session release, or multicast session release notification). Subsequently, when the second session management function network element determines that the multicast session is activated or the multicast session is released, the second session management function network element may send the first message to the first session management function network element based on the subscription request of the first session management function network element.

The identification information of the first session management function network element may identify the first session management function network element. The identification information of the first session management function network element may be stored in the second session management function network element. For example, when the terminal joins the multicast session by using the PDU session, and the first session management function network element extracts the multicast QoS information from the second session management function network element, the second session management function network element stores the identification information of the first session management function network element in correspondence with the identification information of the multicast session. Alternatively, the second session management function network element obtains the identification information of the first session management function network element from another network element. For example, the first session management function network element may send the identification information of the multicast session to a first network element, the first network element receives the identification information of the multicast session, queries a first multicast correspondence by using the identification information of the multicast service as an index, finds the identification information of the first session management function network element corresponding to the identification information of the multicast session, and sends the identification information of the first session management function network element to the second session management function network element.

The first network element may be an NRF, a UDM, a UDR, or a PCF, or may be another network element having a function of selecting an MB-SMF. This is not limited. The first correspondence may include a correspondence between the identification information of the multicast session and the identification information of the first session management function network element, and the first correspondence may be prestored in the first network element.

S503: The first session management function network element determines, based on the first message, that a quantity of PDU sessions in the inactive state in one or more PDU sessions associated with the multicast session satisfies a preset condition.

The PDU session associated with the multicast session may be a PDU session used by the terminal to join the multicast session.

The preset condition may include that a ratio of the quantity of PDU sessions in the inactive state in the one or more PDU sessions associated with the multicast sessions to a total quantity of the one or more PDU sessions associated with the multicast sessions reaches a preset ratio. Alternatively, the preset condition includes that the quantity of PDU sessions in the inactive state in the one or more PDU sessions associated with the multicast sessions reaches a preset quantity threshold, a quantity of terminals corresponding to the one or more PDU sessions associated with the multicast sessions reaches a preset quantity threshold, or a quantity of terminals corresponding to the multicast sessions reaches a preset quantity threshold, where the terminal corresponding to the multicast session may include a terminal that is in one or more terminals that join the multicast session and that is provided with a PDU session management service by the first session management function network element. The preset quantity threshold may be greater than or equal to 1. For example, the preset quantity threshold may be 1, 2, or a value greater than 2.

For example, the first session management function network element may find, by using the identification information of the multicast session included in the first message as an index, a context of the multicast service corresponding to the multicast session, and determine, based on identification information of terminals included in the context of the multicast service, the terminals that join the multicast session. Further, the first session management function network element may view contexts of PDU sessions of the terminals. If the context of the PDU session includes the identification information of the multicast session, the first session management function network element determines that the PDU session is associated with the multicast session, and determines, based on user plane state (upCnxState) information that is of the PDU session and that is included in the context of the PDU session, whether the PDU session is in the inactive state or the active state.

It should be noted that, as shown in FIG. 5, in this embodiment of this application, S503 is an optional step, and S501, S502, S504, and S505 may be performed to optimize the paging procedure, or S501 to S505 may be performed to optimize the paging procedure. This is not limited.

S504: The first session management function network element sends first information to the access and mobility management function network element based on the first message. Correspondingly, the access and mobility management function network element receives the first information from the first session management function network element.

The access and mobility management function network element may be an access and mobility management function network element corresponding to the PDU session associated with the multicast session, or a network element that provides a NAS signaling service for the terminal corresponding to the PDU session associated with the multicast session. As a termination point of non-access stratum (NAS) signaling of the terminal, the access and mobility management function network element is configured to manage/process the NAS signaling of the terminal. For example, the access and mobility management function network element may be responsible for performing encryption and integrity protection on a NAS signaling message of the terminal.

The first information may include the identification information of the multicast session and/or indication information. The indication information may indicate group paging, indicate to perform group paging or implement group paging; or indicate group paging on the terminal corresponding to the multicast session, indicate to perform group paging on the terminal corresponding to the multicast session, or indicate to implement group paging on the terminal corresponding to the multicast session. The indication information includes first indication information or second indication information. When the first information includes the identification information of the multicast session and the indication information, the group paging may be explicitly indicated by using the indication information. When the first information includes the identification information of the multicast session or the indication information of the multicast session, the group paging may be implicitly indicated. For example, the group paging may be indicated by using an information type of the first information.

In this embodiment of this application, the first indication information may indicate to page, in a group paging manner, the terminal corresponding to the multicast session. The terminal corresponding to the multicast session may be a terminal that is in the one or more terminals corresponding to the multicast session and that is provided with the PDU session management service by the first session management function network element. The first indication information may include the identification information of the terminal corresponding to the multicast session. For example, in S503, after the first session management function network element determines, by viewing the context of the multicast service, the terminal that has joined the multicast session, for example, determines that a quantity of terminals that has joined the multicast session is greater than or equal to 1, the first session management function network element includes, in the first indication information, the identification information of the terminal that has joined the multicast session. In this case, the first information that carries the identification information of the multicast session and the first indication information may be carried in one N11 message.

It should be noted that in this embodiment of this application, that the first indication information includes the identification information of the terminal may be replaced with that the first indication information includes a UE list, where the UE list may include the identification information of the terminal that has joined the multicast session.

In this embodiment of this application, the second indication information may indicate to page, in the group paging manner, a terminal corresponding to the PDU session in the inactive state. In a design, the second indication information carries identification information of the terminal corresponding to the associated PDU session in the inactive state. For example, after the first session management function network element determines the associated PDU session in the inactive state in the one or more PDU sessions associated with the multicast sessions in S503, if the quantity of associated PDU sessions in the inactive state is greater than or equal to 1, the first session management function network element includes, in the second indication information, the identification information of the terminal corresponding to the PDU session in the inactive state. In this design, the first information that carries the second indication information and the identification information of the multicast session may be carried in one N11 message. It should be noted that in this design, that the second indication information includes the identification information of the terminal corresponding to the associated PDU session in the inactive state may be replaced with that the second indication information includes a UE list, where the UE list may include the identification information of the terminal corresponding to the PDU session in the inactive-state.

In another design, the second indication information does not carry identification information of the terminal corresponding to the PDU session in the inactive state, and only indicates the access and mobility management function network element to perform group paging. In this case, the access and mobility management function network element may learn of, in the following manner, terminals that correspond to PDU sessions in the inactive state and on which group paging is to be performed: After the first session management function network element determines that the quantity of PDU sessions in the inactive state in the one or more PDU sessions associated with the multicast session satisfies the preset condition, for example, the quantity of PDU sessions in the inactive state is greater than or equal to 1, the first session management function network element sends, to the access and mobility management function network element, a control plane signaling message corresponding to the PDU session in the inactive state in the first session management function network element. One control plane control signaling message corresponds to one PDU session, the control plane signaling message may be service interface (Namf)_communication_N1N2 message transfer (Namf_Communication_N1N2Message Transfer) between the SMF and the AMF, and the control plane signaling message may indicate the access and mobility management function network element to add the terminal corresponding to the PDU session to the multicast session, or indicate the access and mobility management function network element to page the terminal when the terminal corresponding to the PDU session is in a CM-IDLE state, or indicate the access and mobility management function network element to send QoS profile corresponding to the PDU session to the access network device. Because a PDU session corresponds to a terminal, when receiving, from the first session management function network element, a control plane signaling message corresponding to a PDU session, the access and mobility management function network element may learn of the specific PDU session that corresponds to the control plane signaling message, learn of, from a locally stored context of the PDU session, a specific terminal that corresponds to the PDU session, and determine to add the terminal to the multicast session or page the terminal when the terminal is in the CM-IDLE state.

In still another design, assuming that there are N PDU sessions in the inactive state in the one or more PDU sessions associated with the multicast session, and N is an integer greater than or equal to 1, the first information carrying the second indication information may be included in an $N^{th}$ control plane message in N control plane messages or any one of the $1^{st}$ to $N^{th}$ control plane messages. This is not limited. The N control plane messages correspond one-to-one to the N PDU sessions in the inactive state, or the first information is carried in one N11 message, and the N11 message may be sent after the first session management function network element sends the N control plane messages.

For example, in FIG. 1, there are four UEs that have joined a multicast session: UE 1 to UE 4, and there are four PDU sessions associated with the multi cast session: a PDU session X, a PDU session Y, a PDU session Z, and a PDU session H. The PDU session X corresponds to the UE 1, the PDU session Y corresponds to the UE 2, the PDU session Z corresponds to the UE 3, and the PDU session H corresponds to the UE 4. The PDU session X, the PDU session Y, and the PDU session Z are in an inactive state, and the PDU session H is in an active state. In this case, the first session management function network element may send first information {identification information of the multicast session, the UE 1 to the UE 4} to the access and mobility management function network element; or the first session management function network element may send first information {identification information of the multicast session, the UE 1 to the UE 3} to the access and mobility management function network element; or the first session management function network element may send, to the access and mobility management function network element, a control plane signaling message X corresponding to the PDU session X, a control plane signaling message Y corresponding to the PDU session Y, and a control plane signaling message Z corresponding to the PDU session Z, where if the control plane signaling message Z is the last sent control plane signaling message, the control plane signaling message Z may carry second indication information and the identification information of the multicast session, to indicate group paging; or the second indication information may also be carried in the control plane signaling message X or the control plane signaling message Y.

S505: The access and mobility management function network element performs group paging based on the first information; in other words, the access and mobility management function network element performs/implements group paging based on the first information.

In an example, after receiving the first information, if the first information includes the first indication information, the access and mobility management function network element may determine the terminals in the CM-IDLE state based on the identification information of the terminals included in the first indication information, and the access and mobility management function network element determines a group paging area based on registration areas of the terminals in the CM-IDLE state, where the group paging area includes a union set of the registration areas of the terminals in the CM-IDLE state, and the group paging area does not include an overlapping part of the registration areas of the terminals in the CM-IDLE state. The access and mobility management function network element sends a paging message to the group paging area, where the paging message carries the identification information of the multicast session.

In another example, after receiving the first information, if the first information includes the second indication information, and the second indication information includes the identification information of the terminals corresponding to the associated PDU sessions in the inactive state, the access and mobility management function network element determines the terminals in the CM-IDLE state; or if the first information includes the second indication information, and the second indication information does not include the identification information of the terminals corresponding to the associated PDU sessions in the inactive state, the access and mobility management function network element may determine the identification information of the terminals by using control plane signaling messages corresponding to the associated PDU sessions in the inactive state, and then determine, based on the identification information of the terminals, whether the terminals are in the CM-IDLE state. Further, the access and mobility management function network element determines a group paging area based on registration areas of the terminals in the CM-IDLE state, where the group paging area includes a union set of the registration areas of the terminals in the CM-IDLE state, and the group paging area does not include an overlapping part in the registration areas of the terminals in the CM-IDLE state. The access and mobility management function network element sends a paging message to the group paging area, where the paging message carries the identification information of the multicast session. In this embodiment of this application, the paging message carrying the identification information of the multicast session may be referred to as a group paging message.

In this embodiment of this application, a registration area of a terminal may be preconfigured for the terminal by an access and mobility management function network element that provides a NAS signaling service for the terminal. For example, after the terminal registers with the access and mobility management function network element, the registration area is configured for the terminal by the access and mobility management function network element. Information indicating the registration area of the terminal (which may be referred to as registration area information of the terminal in this application) is stored in the access and mobility management function network element. For example, the registration area information of the terminal may be stored in a context of the terminal on the access and mobility management function network element. In addition to the registration area information of the terminal, the context of the terminal may further include identification information of the terminal, other information, and the like. The registration area of the terminal may be an area that is registered for the terminal and that can provide a network service for the terminal. The registration area of the terminal may include one or more access network devices. This is not limited. The access network device included in the registration area of the terminal may support a multicast function, or may not support the multicast function. This is not limited.

It should be noted that when there are a plurality of terminals in the CM-IDLE state, and registration areas of the plurality of terminals have areas overlapping with each other (which may be referred to as overlapping areas in this specification), to reduce signaling overheads, the first access and mobility management function network element may initiate group paging in an overlapping area of one terminal, and does not need to repeatedly initiate group paging in the overlapping areas of the registration areas of all the terminals. For example, the terminals in the CM-IDLE state include a first terminal and a second terminal, and there is an overlapping area between a registration area of the first terminal and a registration area of the second terminal. The access and mobility management function network element may send a paging message in the registration area of the first terminal, and initiate a paging message in an area in the registration area of the second terminal other than the overlapping area. Therefore, the access and mobility management function network element may not repeatedly initiate group paging in an overlapping area of a registration area of each terminal in the CM-IDLE state in terminals that has joined a multicast session, to reduce signaling overheads.

Based on the method shown in FIG. 5, when there are a plurality of PDU sessions in the inactive state in the one or more PDU sessions associated with the multicast session, the first session management function network element may send indication information to the access and mobility management function network element, to indicate the access and mobility management function network element to implement/perform group paging on terminals corresponding to the multicast session, so as to optimize paging areas of the terminals corresponding to the multicast session, so that a paging message is not repeatedly sent in an overlapping area, a paging procedure is optimized, and signaling overheads caused by paging the terminals in the multicast group are reduced.

Optionally, because a CM state of the terminal is managed by the access and mobility management function network element, another network element does not manage the CM state of the terminal. In other words, for the another network element, if the access and mobility management function network element does not notify the another network element of the CM state of the terminal, the another network element does not obtain the CM state of the terminal. When a CM state of a terminal is a CM-CONNECTED state, the terminal may normally receive data, for example, receive data of a multicast service by using a radio bearer that is configured for the terminal and that is used for transmitting the data of the multicast service. However, because the first session management function network element does not manage the CM state of the terminal, the radio bearer used for transmitting the data of the multicast service cannot be configured for the terminal in the CM-CONNECTED state in time. Consequently, it cannot be ensured that the terminal normally receives the data of the multicast service. To resolve this problem, an embodiment of this application provides a communication method shown in FIG. 6.

Figure 6:
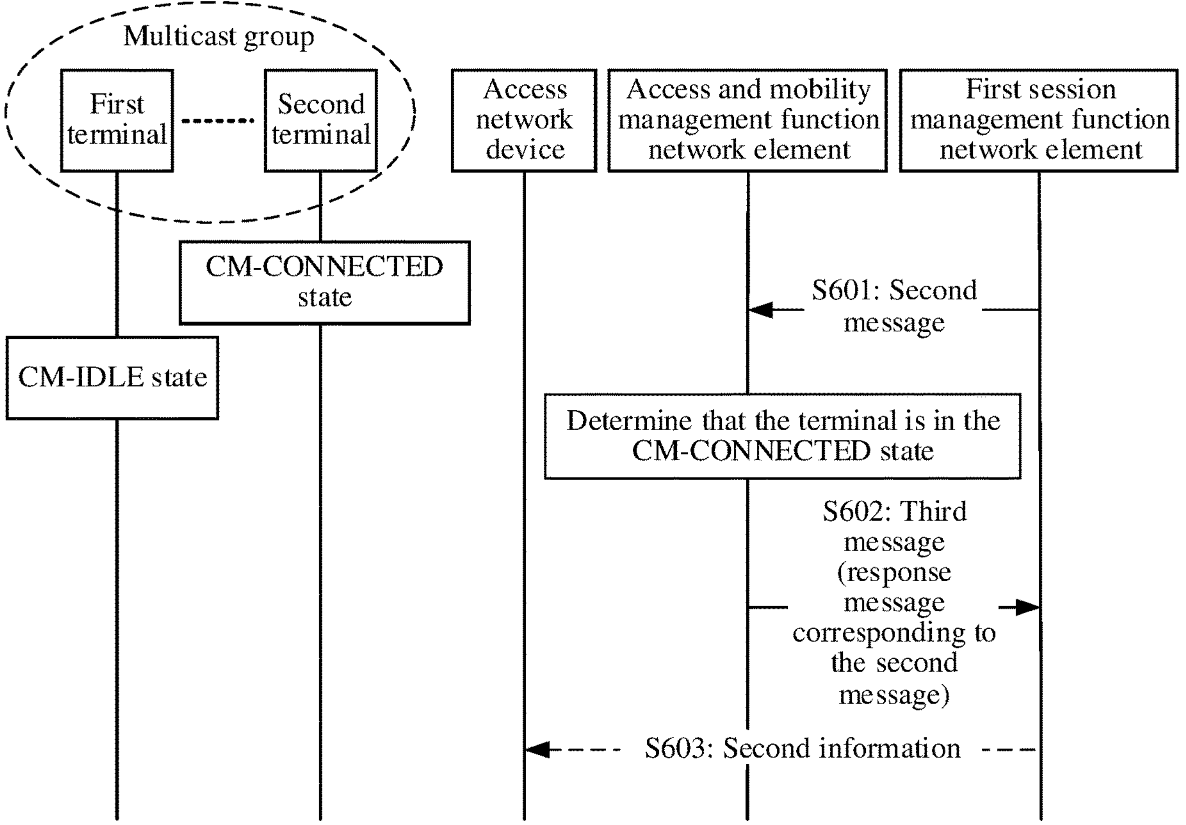
FIG. 6 is a flowchart of a communication method according to an embodiment of this application.

FIG. 6 shows a communication method according to an embodiment of this application. As shown in FIG. 6, the method may include the following steps.

S601: A first session management function network element sends a second message to an access and mobility management function network element. Correspondingly, the access and mobility management function network element receives the second message from the first session management function network element.

The first session management function network element may be configured to manage a PDU session that is in one or more PDU sessions of a first terminal and that is associated with a multicast session. The first session management function network element may be a session management function network element that is selected from a plurality of session management function network elements and that can manage the PDU session of the first terminal. The first session management function network element may be the first session management function network element in FIG. 2 or the SMF in FIG. 3*a*. The first session management function network element may manage the PDU session of the terminal. The access and mobility management function network element may correspond to the terminal, and is an AMF that provides a NAS signaling service for the terminal.

The second message may be used by the access and mobility management function network element to indicate/notify a terminal in a CM-CONNECTED state to the first session management function network element. The second message may be a subscription request, and the subscription request may request to notify the first session management function network element of the terminal in the CM-CONNECTED state. The terminal may be a terminal that joined (or has joined) the multicast session. The second message may include identification information of the multicast session. The second message may be replaced with descriptions of triggering the access and mobility management function network element to indicate/notify, to the first session management function network element, the terminal that is in the CM-CONNECTED state and that is of one or more terminals that have joined the multicast session. For example, the access and mobility management function network element sends, to the first session management function network element, a third message indicating that the terminal is in the CM-CONNECTED state.

Optionally, when the access and mobility management function network element pages the terminal that has joined the multicast session and that is in a CM-IDLE state, there is a scenario in which the access and mobility management function network element may page a part of terminals in the CM-IDLE state or may not page the part of terminals in the CM-IDLE state. In this scenario, not all the terminals in the CM-IDLE state are paged and are still in the CM-IDLE state, and it cannot be ensured that the terminal that has joined the multicast session normally receives data of a multicast service. To resolve this problem, in this embodiment of this application, the second message may be further used by the access and mobility management function network element to page/indicate the access and mobility management function network element to page ("immediately paging", "page immediately", "immediately page", "paging", or "may page") the terminal that has joined the multicast session and that is in the CM-IDLE state. In other words, the second message indicates the access and mobility management function network element to page (which may be "immediately paging", "may page", or the like) the terminal that has joined the multicast session and that is in the CM-IDLE state, this avoids a problem that the terminal that has joined the multicast session and that is in the CM-IDLE state may not be paged, and ensures that the terminal that has joined the multicast session normally receives the data of the multicast service. The second message may include identification information of one or more terminals that have joined the multicast session. Optionally, the second message may further include the identification information of the multicast session. Alternatively, that the second message includes the identification information of the one or more terminals that have joined the multicast session may be replaced with that the second message includes a UE identifier list (UE ID List or UE identification information (UE ID)), and the UE list may include the identification information of the one or more terminals that have joined the multicast session.

Further, optionally, when the second message is used by the access and mobility management function network element/indicates the access and mobility management function network element to page the terminal that has joined the multicast session and that is in the CM-IDLE state, the second message may further include third indication information, and the third indication information may indicate the access and mobility management function network element to page (which may be "immediately page", "may page", or "page"), when the terminal that has joined the multicast session is in the CM-IDLE state, the terminal that has joined the multicast session and that is in the CM-IDLE state. Alternatively, the second message does not include third indication information, and the second message has a function of indicating the access and mobility management function network element to page the terminal that has joined the multicast session and that is in the CM-IDLE state. For example, a message type/message format of the second message corresponds to an indication of paging the terminal that has joined the multicast session and that is in the CM-IDLE state.

The second message may be a newly defined N11 message, or the second message may be an enable terminal reachability message (Namf_MT_EnableUEReachability, MBS_MT_Reachability, or the like). A signaling name of the second message is not limited in this embodiment of this application. For example, the second message may be an enable terminal reachability request Namf_MT_EnableUEReachability request or an MBS_MT_Reachability request. Alternatively, the second message may be Namf_EventExposure_Subscribe or the like.

In this embodiment of this application, paging the terminal that has joined the multicast session and that is in the CM-IDLE state may be: After receiving the second message, the access and mobility management function network element locates, based on the identification information of the multicast session and the identification information of the one or more terminals that have joined the multicast session that are carried in the second message, the terminal that has joined the multicast session and that is in the CM-IDLE state; or locate, based on the identification information of the one or more terminals that have joined the multicast session, the terminal that has joined the multicast session and that is in the CM-IDLE state, and page the terminal in the CM-IDLE state.

For example, when the first session management function network element receives a first message from the second session management function network element, the first session management function network element performs S601. For this process, refer to the descriptions in the embodiment corresponding to FIG. 7.

S602: The access and mobility management function network element sends a third message to the first session management function network element based on the second message. Correspondingly, the first session management function network element receives the third message from the access and mobility management function network element.

In this embodiment of this application, the third message may include identification information of the first terminal and/or the identification information of the multicast session. The first terminal may be a terminal in the CM-CONNECTED state, for example, the first terminal includes a terminal in the CM-CONNECTED state or a terminal that is in the CM-CONNECTED state and that has joined the multicast session. The third message may indicate the first terminal in the CM-CONNECTED state. It should be understood that before S602, the CM state of the first terminal may be the CM-CONNECTED state or the CM-IDLE state. For related descriptions of the identification information of the first terminal and related descriptions of the identification information of the multicast session, refer to the foregoing descriptions. Details are not described again. The third message may be a reply message corresponding to the second message, or the third message may be a notification message. For example, if the first session management function network element subscribes to, from the access and mobility management function network element, an event of notifying the first session management function network element of the terminal in the CM-CONNECTED state, for example, a subscription message corresponding to the first session management function network element may be Namf_EventExposure_Subscribe, the third message may be a notification message corresponding to the subscription message, for example, a notification message/reply message for Namf_EventExposure_Subscribe, for example, may be Namf_EventExposure_Notify.

That the access and mobility management function network element sends a third message to the first session management function network element based on the second message may include: The access and mobility management function network element determines, based on the second message, that the terminal is in the CM-CONNECTED state, and sends the third message to the first session management function network element.

In an example, before S602, the CM state of the first terminal is the CM-IDLE state, and that the access and mobility management function network element sends a third message to the first session management function network element based on the second message may include: The access and mobility management function network element pages, based on the second message, a terminal that is in the CM-IDLE state and that includes the first terminal. If receiving a service request from the first terminal, the access and mobility management function network element establishes a NAS signaling connection for the first terminal based on the service request of the first terminal, switches the first terminal from the CM-IDLE state to the CM-CONNECTED state, and sends the third message to the first session management function network element. For the process, refer to S704 to S706 in FIG. 7.

In another example, before S602, the CM state of the first terminal is the CM-CONNECTED state, and that the access and mobility management function network element sends a third message to the first session management function network element based on the second message may include: The access and mobility management function network element locates, based on the identification information of the multicast session and the identification information of the one or more terminals that have joined the multicast session that are carried in the second message, that the first terminal of the one or more terminals that have joined the multicast session is in the CM-CONNECTED state; or locates, based on the identification information of the one or more terminals that have joined the multicast session, that the first terminal that has joined the multicast session is in the CM-CONNECTED state, and sends the third message to the first session management function network element. For the process, refer to S707 in FIG. 7.

In the foregoing example, the access and mobility management function network element may send the third message to the first session management function network element based on identification information of the first session management function network element. The identification information of the first session management function network element may identify the first session management function network element. The access and mobility management function network element may store the identification information of the first session management function network element (for example, an SMF ID) when the first terminal establishes the PDU session associated with the multicast session.

Optionally, if there is a terminal in the CM-IDLE state in the one or more terminals that have joined the multicast session, for example, the terminal in the CM-IDLE state includes the first terminal, after receiving the second message, the access and mobility management function network element may page the terminal in the CM-IDLE state based on the second message. For example, the access and mobility management function network element determines the terminal in the CM-IDLE state based on the second message, and the access and mobility management function network element sends a paging message in a paging area of the terminal in the CM-IDLE state, where the paging message includes the identification information of the multicast session, and the paging area of the terminal in the CM-IDLE state includes an access network device that supports a multicast capability.

For related descriptions and a determining manner of the paging area of the terminal in the CM-IDLE state, refer to the descriptions in the embodiment corresponding to FIG. 5. Details are not described again.

Further, optionally, as shown in FIG. 6, the method may further include:

S603: The first session management function network element sends, based on the third message, second information to an access network device corresponding to the first terminal. Correspondingly, the access network device corresponding to the first terminal receives the second information.

The second information may be used by the access network device to configure a radio bearer used for transmitting the data of the multicast service, or used by the access network device to release a resource used for transmitting the data of the multicast service to the first terminal. The resource may include one or more of the radio bearer used for transmitting the data of the multicast service to the first terminal, multicast QoS information corresponding to the multicast service, or unicast QoS information corresponding to the multicast QoS information.

For example, after receiving the third message, if the first session management function network element determines that the multicast session is activated and/or the PDU session that is of the first terminal and that is associated with the multicast session is activated, the first session management function network element sends the second information to the access network device corresponding to the first terminal. The second information may be used by the access network device to configure the radio bearer used for transmitting the data of the multicast service. The radio bearer may be a multicast radio bearer and/or a unicast radio bearer or a radio bearer.

For another example, after receiving the third message, if the first session management function network element determines that the multicast session is released and/or the PDU session that is of the first terminal and that is associated with the multicast session is deactivated, the first session management function network element sends the second information to the access network device corresponding to the first terminal. The second information may be used by the access network device to release the resource used for transmitting the data of the multicast service to the first terminal. The resource includes one or more of the radio bearer used for transmitting the data of the multicast service to the first terminal, the multicast QoS information corresponding to the multicast service, or the unicast QoS information corresponding to the multicast QoS information.

It should be noted that, for a case of MBS session activation, the first session management function network element receives the third message. Optionally, when the multicast-associated PDU session is deactivated, the access network device retains unicast QoS information corresponding to multicast QoS information corresponding to the multicast session; in addition, when the unicast QoS information does not need to be updated, the first session management function network element may not send the second information to the access network device corresponding to the first terminal. Optionally, when the PDU session associated with the multicast is deactivated, and the access network device does not retain the unicast QoS information corresponding to the multicast QoS information corresponding to the multicast session, the first session management function network element may/needs to send the second information to the access network device corresponding to the first terminal. Optionally, when the PDU session associated with the multicast session is deactivated, the access network device retains the unicast QoS information corresponding to the multicast QoS information corresponding to the multicast session; in addition, when the unicast QoS information needs to be updated, the first session management function network element may/needs to send the second information to the access network device corresponding to the first terminal.

It should be further noted that, for a case of MBS session release, after the first session management function network element receives the third message, the first session management function network element may/needs to send the second information to the access network device corresponding to the first terminal.

In an example, the second information is used by the access network device to configure the radio bearer used for transmitting the data of the multicast service. The second information includes at least one of the following: the identification information of the multicast session, the multicast quality of service QoS information corresponding to the multicast session, the unicast QoS information corresponding to the multicast QoS information, or a unicast QoS flow ID corresponding to a multicast quality of service flow QoS flow. Alternatively, the second information includes at least one of the following: QoS profile corresponding to the multicast session, where the QoS profile may include the multicast QoS information (or referred to as multicast QoS profile) corresponding to the multicast session and/or the unicast QoS information corresponding to the multicast QoS information corresponding to the multicast session. The second information may be included in N2 SM information, or the second information may be N2 SM information. The second information is sent by the first session management function network element to the access network device, and is used by the access network device to allocate, based on the second information, the radio bearer (for example, a data radio bearer (data radio bearer, DRB) or a multicast radio bearer (MRB)) for transmitting the data of the multicast service.

In another example, the second information is used by the access network device to release the resource used for transmitting the data of the multicast service to the first terminal. The second information may include one or more of the following: the identification information of the multicast session, the unicast QoS flow ID corresponding to the multicast QoS flow, the multicast quality of service QoS information corresponding to the multicast session, the unicast QoS information corresponding to the multicast QoS information, or a release indication, where the release indication indicates to release the multicast QoS information corresponding to the multicast session and/or the unicast QoS information corresponding to the multicast QoS information corresponding to the multicast session.

In this embodiment of this application, the multicast QoS information (for example, multicast QoS profile) corresponding to the multicast session may be used for establishing or indicate a transmission resource that is in the multicast session and that is used for transmitting the multicast service. The multicast QoS information may be used by the access network device to configure a DRB, an MRB, or an RB corresponding to the multicast session. The multicast QoS information may include one or more of the following: identification information (for example, a multicast QFI) of the multicast QoS flow, a QoS parameter (for example, a QoS profile, including but not limited to a 5QI, an ARP, and a session-AMBR) corresponding to the multicast QoS flow, and tunnel information corresponding to the multicast QF. The multicast QoS flow may be a QoS flow that is included in the PDU session of the first terminal and that is used for transmitting the data of the multicast service. The tunnel information corresponding to the multicast QoS flow may identify a tunnel for transmitting the data of the multicast service to the first terminal in a multicast transmission mode.

In this embodiment of this application, the unicast QoS information corresponding to the multicast QoS information may be used for establishing or indicate a transmission resource that is in a unicast session corresponding to the multicast service (namely, a PDU associated with the multicast session) and that is used for transmitting the multicast service. The unicast QoS information corresponding to the multicast QoS information may be used for establishing a unicast QoS flow (QF); or indicate a QF that is in one or more established unicast QFs and that can be used for transmitting the data of the multicast service. The unicast session corresponds to the first terminal. The unicast session may be referred to as a PDU session of the first terminal, and the PDU session of the first terminal is used for transmitting the data of the multicast service. The unicast QoS information corresponding to the multicast QoS information may include one or more of the following: identification information (for example, a unicast QFI) of the unicast QF, and a QoS parameter (for example, a QoS profile, including but not limited to a 5QI, an ARP, and a session-AMBR) corresponding to the unicast QF.

For example, that the first session management function network element sends, based on the third message, second information to an access network device corresponding to the first terminal may include: The first session management function network element finds, based on the identification information that is of the first terminal and that is carried in the third message, a context of the PDU session that is of the first terminal and that is associated with the multicast session, and obtains the unicast QoS information corresponding to the multicast QoS information from the context of the PDU session of the first terminal; and/or finds a context of the multicast session based on the identification information that is of the multicast session and that is carried in the third message; obtains the multicast QoS information corresponding to the multicast session from the context of the multicast session; includes, in the second information, one or more pieces of information such as the identification information of the multicast session, the multicast QoS information corresponding to the multicast session, the unicast QoS information corresponding to the multicast QoS information, and an indication for releasing the multicast QoS information corresponding to the multicast session and/or the unicast QoS information corresponding to the multicast QoS information corresponding to the multicast session; and sends the second information to the access network device corresponding to the first terminal.

In this application, that the first session management function network element sends, based on the third message, second information to an access network device corresponding to the first terminal may include: The first session management function network element includes the second information in an N2 SM message (N2 SM Information), or the second information may be N2 SM Information; or includes the second information in an N1N2 message (for example, Namf_Communication_N1N2MessageTransfer) or a PDU session update session management context response (Nsmf_PDUSession_UpdateSMContext response), and sends the N1N2 message to the access and mobility management function network element; and the access and mobility management function network element obtains the N2 SM message, includes the N2 SM message in an N2 message, and sends the N2 message to the access network device, to trigger the access network device to configure the radio bearer for transmitting the data of the multicast service or release the resource used for transmitting the data of the multicast service to the first terminal.

The N2 SM message may correspond to the first terminal. When the second information indicates to configure the radio bearer used for transmitting the data of the multicast service, the N2 SM message may be a PDU session resource setup request or response (PDU session resource setup request/response) or a PDU session resource modify request or response (PDU session resource modify request/response) corresponding to the PDU session of the first terminal.

When the second information is used by the access network device to release the resource used for transmitting the data of the multicast service to the first terminal, the N2

SM message may be a PDU session resource setup request or response (PDU session resource setup request/response) or a PDU session resource modify request or response (PDU session resource modify request/response) corresponding to the PDU session of the first terminal. Further, after receiving the second information, the access network device corresponding to the first terminal may configure, based on the second information, the radio bearer used for transmitting the data of the multicast service, or release the resource corresponding to the multicast session, remove the first terminal from the multicast session, release the unicast QoS information corresponding to the multicast QoS information, or the like.

It should be noted that the N2 SM information may be PDU session resource setup request transfer, PDU session resource setup reply transfer, PDU session resource modify request transfer, PDU session resource modify reply transfer, PDU session resource notification transfer, PDU session resource modify indication transfer, PDU session resource modify confirm transfer, PDU session resource release command transfer, PDU session resource notification release transfer, or PDU session resource release response transfer. This is not limited.

Based on the method shown in FIG. 6, the first session management function network element may indicate the access and mobility management function network element to indicate the terminal in the CM-CONNECTED state to the first session management function network element, and trigger the first session management function network element to send, to the access network device corresponding to the first terminal, related information used for configuring the radio bearer corresponding to the multicast session and/or the radio bearer corresponding to the PDU session associated with the multicast session, so that the access network device corresponding to the first terminal configures the radio bearer corresponding to the multicast session and/or the radio bearer corresponding to the PDU session associated with the multicast session, to ensure that the first terminal can normally receive the data of the multicast service; or trigger the first session management function network element to indicate the access network device to release the resource used for transmitting the data of the multicast service to the first terminal, where the resource includes the radio bearer used for transmitting the data of the multicast service to the first terminal and/or the multicast QoS information corresponding to the multicast service and/or the unicast QoS information corresponding to the multicast QoS information.

Figure 7:
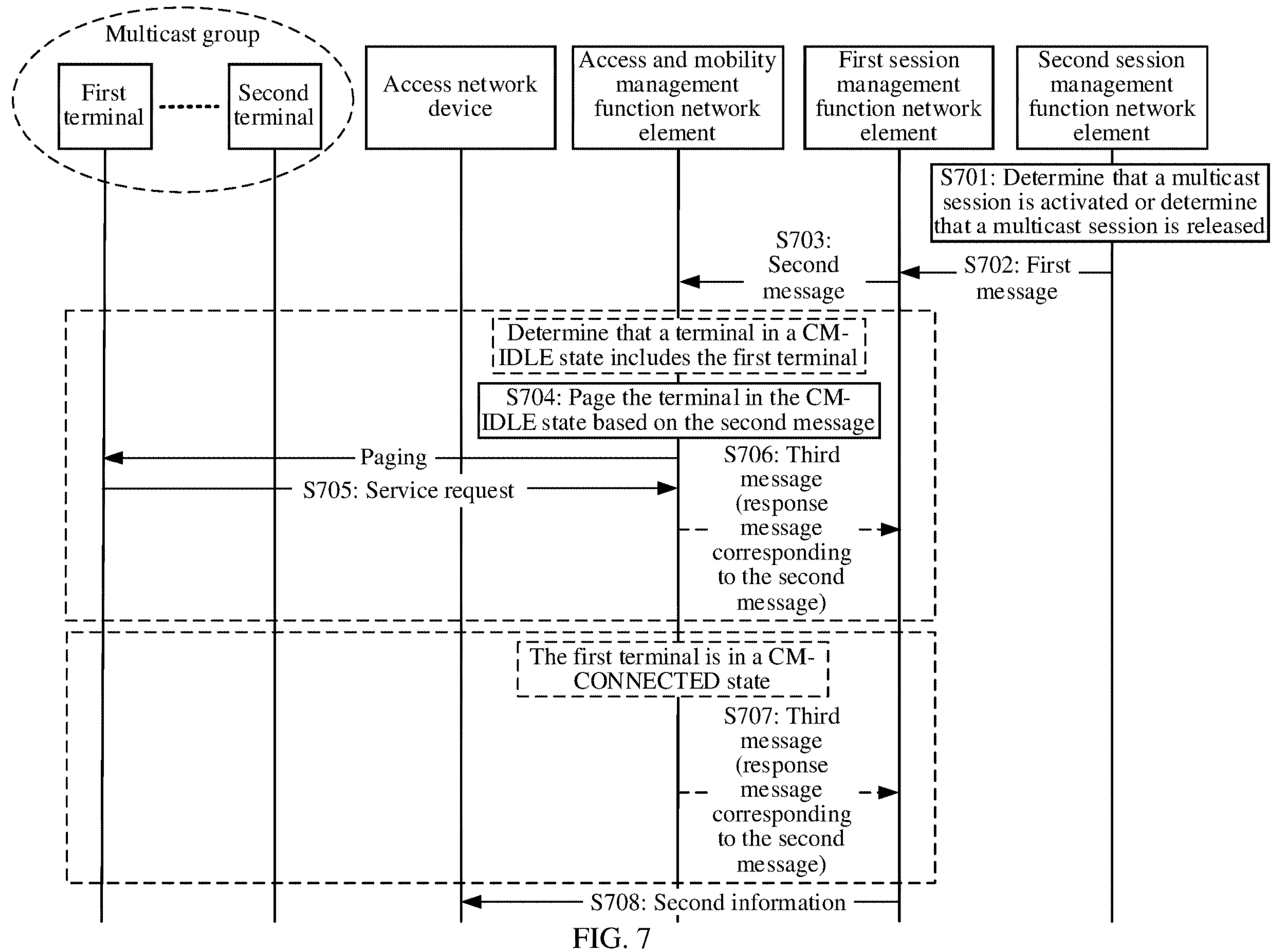
FIG. 7 is a flowchart of a communication method according to an embodiment of this application.

FIG. 7 shows a communication method according to an embodiment of this application. As shown in FIG. 7, the method may include the following steps.

S701: A second session management function network element determines that a multicast session is activated or determines to activate a multicast session; or a second session management function network element determines that a multicast session is released or determines to release a multicast session.

S701 is the same as S501. Details are not described again.

S702: The second session management function network element sends a first message to a first session management function network element. Correspondingly, the first session management function network element receives the first message from the second session management function network element.

For related descriptions of the first message and an execution process of S702, refer to the descriptions in S502. Details are not described again.

S703: The first session management function network element sends a second message to an access and mobility management function network element based on the first message. Correspondingly, the access and mobility management function network element receives the second message from the first session management function network element.

Related descriptions of the second message and an execution process of S703 are the same as those in S601. Details are not described again.

Further, after receiving the second message from the first session management function network element, the access and mobility management function network element performs S704 to S706 for a terminal in a CM-IDLE state in terminals that join a multicast session or a terminal in the CM-IDLE state. For the terminal in the CM-CONNECTED state in the terminals that join the multicast session or the terminal in the CM-CONNECTED state, S707 is directly performed.

It should be noted that in this embodiment of this application, the access and mobility management function network element may not perceive whether the terminal joins the multicast session, or may perceive whether the terminal joins the multicast session. Perceiving whether the terminal joins the multicast session means that the access and mobility management function network element knows whether the terminal is in a multicast group corresponding to the multicast session. For example, when an access network device stores a context of the multicast session (for example, an MBS session context), the access and mobility management function network element may perceive that the terminal joins the multicast session. In this case, the access and mobility management function network element may perceive that the terminal joins the multicast session, and may perceive a CM state of the terminal that has joined the multicast session. On the contrary, when the access and mobility management function network element does not store a context of the multicast session (for example, an MBS session context), the access and mobility management function network element does not perceive that the terminal joins the multicast session. In this case, the access and mobility management function network element does not perceive that the terminal joins the multicast session, but may perceive a CM state of the terminal.

In this embodiment of this application, an example in which the access and mobility management function network element can perceive that the terminal joins the multicast session is used. For the access and mobility management function network element, the terminal that has joined the multicast session and that is in the CM-IDLE state may include one or more terminals, for example, a first terminal and a third terminal. The terminal that has joined the multicast session and that is in the CM-IDLE state may be a terminal that has joined the multicast session, has no NAS signaling connection to the access and mobility management function network element, and cannot send NAS signaling to the access and mobility management function network element. The terminal may join the multicast session by using a PDU session of the terminal. For a manner of that has joined the multicast session by using the PDU session, refer to the foregoing descriptions. Details are not described again. The terminal that has joined the multicast session and that is in the CM-CONNECTED state may also include one or more terminals, for example, include a second terminal and a fourth terminal.

S704: The access and mobility management function network element pages, based on the second message, the terminal in the CM-IDLE state.

The terminal in the CM-IDLE state may include one or more terminals, for example, a first terminal and a second terminal. The first terminal is used as an example. The first terminal may be any terminal in FIG. 2. The first terminal may complete network registration by using the access and mobility management function network element, and the access and mobility management function network element provides a NAS signaling service for the first terminal. When the first terminal has a requirement for that has joined a multicast service/a multicast service requirement, the first terminal may further send a PDU session establishment request/PDU session modification request to the first session management function network element through the access and mobility management function network element. The PDU session establishment request/PDU session modification request may carry identification information of a PDU session of the first terminal and identification information of the multicast session, to trigger the first session management function network element to add the first terminal to the multicast session based on the identification information of the multicast session. The PDU session establishment request may request to establish the PDU session of the first terminal, and the PDU session modification request may request to modify the PDU session of the first terminal. The first terminal is added to the multicast session by using a PDU session establishment procedure or a PDU session establishment procedure. In this case, the PDU session of the first terminal is associated with the multicast session, and the PDU session of the first terminal may be used by the first terminal to join the multicast session.

After the first terminal completes the network registration, the access and mobility management function network element may store a context (for example, a UE context) of the first terminal. The context of the first terminal includes CM state information of the first terminal. The CM state information may indicate whether the first terminal is in the CM-IDLE state or the CM-CONNECTED state. In this embodiment of this application, the access and mobility management function network element may learn, based on information sent by the first session management function network element, that the first terminal joins the multicast session. For example, the first session management function network element may send, to the access and mobility management function network element, the second message that carries the identification information of the multicast session and a UE list. The access and mobility management function network element receives the second message. If determining, based on the second message, that the UE list includes identification information of the first terminal, access and mobility management function network element determines that the first terminal joins the multicast session. After learning that the first terminal joins the multicast session, the access and mobility management function network element may view the context of the first terminal. If the CM state information in the context of the first terminal indicates that the first terminal is in the CM-CONNECTED state, the access and mobility management function network element may directly determine, based on the CM state information included in the context of the first terminal, whether the first terminal is in the CM-CONNECTED state or the CM-IDLE state, to page the terminal in the CM-IDLE state.

In an example, the access and mobility management function network element may (immediately) page, based on the second message and multicast capability information of an access network device in a registration area of a terminal that has joined the multicast session and that is in the CM-IDLE state, the terminal that has joined the multicast session and that is in the CM-IDLE state. For example, the access and mobility management function network element may determine, based on the identification information that is of the multicast session and that is carried in the second message, a terminal that has joined the multicast session; or determine, based on the identification information of the multicast session and identification information of a terminal that has joined the multicast session, the terminal that has joined the multicast session; or determine, based on identification information of a terminal that has joined the multicast session, the terminal that has joined the multicast session; or determine, based on an identification list of a terminal that has joined the multicast session, the terminal that has joined the multicast session. For a terminal that has joined the multicast session, a CM state of the terminal in a context that is of the terminal and that is stored in the access and mobility management function network element is viewed, and if the CM state of the terminal is the CM-IDLE state, registration area information of the terminal is obtained from the context of the terminal, an access network device included in a registration area of the terminal is learned of based on the registration area information of the terminal, and further, it is determined, based on multicast capability information of the access network device included in the registration area of the terminal, whether a paging message carrying the identification information of the multicast session or a paging message carrying identification information of the terminal is to be sent to the access network device.

For related descriptions of the registration area of the terminal, refer to the descriptions in the embodiment corresponding to FIG. 5. Details are not described again. The registration area of the terminal may include one or more access network devices, and the access network devices included in the registration area of the terminal include an access network device that supports a multicast function and/or an access network device that does not support the multicast function.

In this embodiment of this application, the multicast capability information of the access network device may indicate whether the access network device supports the multicast function or indicate whether the access network device has a multicast capability. An access network device that supports the multicast function can identify the identification information of the multicast session, and an access network device that does not support the multicast function cannot identify the identification information of the multicast session. That the access network device has the multicast capability may mean that the access network device has one or more of the following functions: The access network device supports transmitting data of the multicast service by using the 5GC shared MBS traffic delivery manner shown in FIG. 3*c*, supports enhancement of signaling plane interaction with a core network control plane network element for the multicast service, supports receiving of the data of the multicast service from a core network user plane function network element, supports local processing of the data of the multicast service, and supports point to multipoint sending of the data of the multicast service through an air interface, and configuration the terminal to receive the data of the multicast service. That the access network device does not have the multicast capability may mean that the access network device does not support transmitting the data of the multicast service in the 5GC shared MBS traffic delivery manner shown in FIG. 3*c*, and supports transmitting the data of the multicast service only in the 5GC individual MBS traffic delivery manner shown in FIG. 3*c*. For example, the multicast capability information of the access network device may include a specific multicast capability of the access network device or the access network device does not have the multicast capability, and may further include indication information corresponding to the multicast capability of the access network device. The indication information indicates the multicast capability of the access network device. For example, the indication information may be a binary bit 0 or 1. If the indication information is a binary bit 0, it indicates that the access network device has the multicast capability; or if the indication information is a binary bit 1, it indicates that the access network device does not have the multicast capability.

In a design, the multicast capability information of the access network device may be obtained by the access and mobility management function network element from the access network device when the access network device and/or the access and mobility management function network element are/is powered on (or the device is deployed to access a network and starts to work). For example, when the access and mobility management function network element and/or the access network device are/is powered on, the access and mobility management function network element and the access network device exchange respective profiles. The profile may include the multicast capability information of the access network device, capability information of the access and mobility management function network element, load information of the access network device, and the like. The multicast capability information of the access network device is described above. The capability information of the access and mobility management function network element may indicate whether the access and mobility management function network element supports providing the NAS signaling service for a terminal that has joined the multicast session. The load information of the access network device may indicate a quantity of terminals accessing the access network device, and the like.

In another design, the access and mobility management function network element obtains the multicast capability information of the access network device by using pre-configured information sent by a network management system (for example, operations, administration and maintenance (OAM)). For example, the network management system may obtain the multicast capability information of the access network device when the access network device accesses the network, include the multicast capability information of the access network device in the pre-configured information, and pre-configure the pre-configured information for the access and mobility management function network element.

For example, the terminal that has joined the multicast session and that is in the CM-IDLE state includes the first terminal and the second terminal. That the access and mobility management function network element may (immediately) page, based on the second message and multicast capability information of an access network device in a registration area of a terminal that has joined the multicast session and that is in the CM-IDLE state, the terminal that has joined the multicast session and that is in the CM-IDLE state may include:

If a first access network device in a registration area of the first terminal supports the multicast function, the access and mobility management function network element sends a paging message to the first access network device, where the paging message includes the identification information of the multicast session; and/or if a second access network device in the registration area of the first terminal does not support the multicast function, the access and mobility management function network element sends a paging message to the second access network device, where the paging message includes the identification information of the first terminal, that is, paging is performed at a granularity of UE.

It should be understood that if a registration area of the second terminal also includes the first access network device, and the first terminal is different from the second terminal, a paging message including the identification information of the multicast session needs to be sent to the first access network device only once, and the paging message does not need to be sent to the first access network device for a plurality of times, to reduce signaling overheads.

For an access network device that supports the multicast function, a paging message that carries the identification information of the multicast session is sent to the access network device, so that the access network device identifies the identification information of the multicast session included in the paging message, and initiates, based on the identification information of the multicast session, group paging to a plurality of terminals that have joined the multicast session and that are in the CM-IDLE state (for example, an RRC inactive state or an RRC IDLE state), so that signaling overheads are reduced. For an access network device that does not support the multicast function, a paging message that carries identification information of a terminal is sent to the access network device, so that the access network device initiates paging for the terminal based on the identification information of the terminal, to avoid a paging failure caused because the access network device that does not support the multicast function cannot identify the identification information of the multicast session.

For example, the access network device is a base station, the terminal is UE, and the access and mobility management function network element is an AMF. Registration areas are pre-allocated to UE 1 and UE 2 that are in a CM-IDLE state. The registration area of the UE 1 includes a base station 1, a base station 2, and a base station 3. The registration area of the UE 2 includes a base station 2, a base station 3, and a base station 4. If the base station 2 and the base station 3 support a multicast function, and the base station 1 and the base station 4 do not support the multicast function, the AMF sends, to the base station 2 and the base station 3, a paging message carrying identification information of a multicast session, so that the base station 2 and the base station 3 perform group paging for the UE 1 and the UE 2. For the base station 1 and the base station 4, the AMF sends, to the base station 1, a paging message that carries identification information of the UE 1, and sends, to the base station 4, a paging message that carries identification information of the UE 2.

In another example, that the access and mobility management function network element pages, based on the second message, the terminal in the CM-IDLE state may include: The access and mobility management function network element sends, based on the second message, a fourth message to an access network device in a registration area of the terminal that has joined the multicast session and that is in the CM-IDLE state, where the fourth message includes identification information of the terminal that has joined the multicast session and that is in the CM-IDLE state and the identification information of the multicast session. For example, it is assumed that the terminal that has joined the multicast session and that is in the CM-IDLE state includes the first terminal, and the fourth message may include the identification information of the first terminal and the identification information of the multicast session.

The fourth message may be used by the access network device to page a terminal that is provided with a network service by the access network device in one or more terminals that have joined the multicast session and that are in the CM-IDLE state. For example, the access network device is triggered to page, based on the fourth message and multicast capability information of the access network device, the terminal that is provided with the network service by the access network device in the one or more terminals that have joined the multicast session and that are in the CM-IDLE state.

In this embodiment of this application, that the access network device pages, based on the fourth message and the multicast capability information of the access network device, the terminal that is provided with the network service by the access network device in the one or more terminals that have joined the multicast session and that are in the CM-IDLE state may include: If the access network device supports the multicast function, the access network device identifies the identification information that is of the multicast session and that is in the fourth message, and the access network device sends only one paging message within a signal range covered by the access network device, to reduce paging signaling overheads. If the access network device does not support the multicast function, the access network device cannot identify the identification information that is of the multicast session and that is included in the fourth message. The access network device sends one or more paging messages for per UE in a coverage area of the access network device based on identification information that is of the terminal and that is carried in the fourth message. The paging message may include the identification information of the terminal.

For example, the access network device is a base station, and the terminal is UE. Terminals that join a multicast session and that are in an inactive CM-IDLE state include UE 1 to UE 4. The UE 1 and the UE 2 are served by a base station 1, the UE 3 and the UE 4 are served by a base station 2, the base station 1 supports a multicast function, and the base station 2 does not support the multicast function. In this case, after the base station 1 and the base station 2 receive a fourth message, the base station 1 sends a paging message that carries identification information of the multicast session, to implement group paging for the UE 1 and the UE 2. After receiving the fourth message, the base station 2 sends a paging message carrying identification information of the UE 3 and a paging message carrying identification information of the UE 4.

Further, as shown in FIG. 7, after the terminal (for example, the first terminal) that has joined the multicast session receives a paging message, if the terminal finds that a PDU session associated with the multicast session is in an inactive state; or the terminal determines that the terminal has a requirement for the multicast service, or needs to make a reply (paging response) to the paging message according to the conventional technology, the terminal initiates/sends a service request to the access and mobility management function network element through an access network device corresponding to the terminal.

The first terminal is used as an example. As shown in FIG. 7, the method may further include the following steps.

S705: If the first terminal finds that the PDU session associated with the multicast session is in the inactive state; or the first terminal determines that the first terminal has a requirement for the multicast service, or needs to make a reply (paging response) to the paging message according to the conventional technology, the first terminal initiates/sends a service request to the access and mobility management function network element through an access network device corresponding to the first terminal. Correspondingly, the access and mobility management function network element receives the service request.

The service request may be used for establishing a NAS signaling connection between the first terminal and the access and mobility management function network element, and the service request may include the identification information of the first terminal.

S706: The access and mobility management function network element establishes the NAS signaling connection between the first terminal and the access and mobility management function network element based on the service request, switches (switches to) the first terminal from the CM-IDLE state to the CM-CONNECTED state, and sends a third message to the first session management function network element. Correspondingly, the first session management function network element receives the third message from the access and mobility management function network element.

Related descriptions of the third message and an execution process of S707 are the same as those in S602. Details are not described again.

S707: If there is a first terminal in the CM-CONNECTED state (or the first terminal is in the CM-CONNECTED state), the access and mobility management function network element directly sends the third message to the first session management function network element based on the second message. Correspondingly, the first session management function network element receives the third message from the access and mobility management function network element.

Related descriptions of the third message and an execution process of S707 are the same as those in S602. Details are not described again.

S708: The first session management function network element sends, based on the third message, second information to the access network device corresponding to the first terminal. Correspondingly, the access network device corresponding to the first terminal receives the second information.

Related descriptions of the second information and an execution process of S708 are the same as those in S603. Details are not described again.

The first terminal is used as an example above for description. Similarly, for another terminal, refer to the foregoing descriptions. For example, for the second terminal that has joined the multicast session, if a PDU session that is of the second terminal and that is associated with the multicast session is also managed by the first session management function network element, after receiving the second message, an access and mobility management function network element corresponding to the second terminal finds that the second terminal is also in the CM-IDLE state. The access and mobility management function network element corresponding to the second terminal may also page the second terminal first with reference to S704 to S706, and then send a fifth message to the first access network device after the second terminal is in the CM-CONNECTED state, where the fifth message may include identification information of the second terminal and/or the identification information of the multicast session, to trigger the first session management function network element to indicate the access network device corresponding to the second terminal to configure a radio bearer used for transmitting the data of the multicast service to the second terminal, release a resource used for transmitting the data of the multicast service to the second terminal, or the like. Alternatively, after receiving the second message, if an access and mobility management function network element corresponding to the second terminal finds that the second terminal is in the CM-CONNECTED state, the access and mobility management function network element corresponding to the second terminal may directly indicate/notify the second terminal in the CM-CONNECTED state to the first session management function network element with reference to S707, to trigger the first session management function network element to indicate an access network device corresponding to the second terminal to configure a radio bearer used for transmitting the data of the multicast service to the second terminal, release a resource used for transmitting the data of the multicast service to the second terminal, or the like.

Based on the method shown in FIG. 7, when the access and mobility management function network element determines that the terminal that has joined the multicast session is in the CM-CONNECTED state, the access and mobility management function network element may trigger the first session management function network element to send, to the access network device corresponding to the first terminal, related information used for configuring a radio bearer corresponding to the multicast session, so that the access network device corresponding to the first terminal configures the radio bearer corresponding to the multicast session and/or a radio bearer corresponding to the PDU session associated with the multicast session, to ensure that the first terminal can normally receive the data of the multicast service. Alternatively, when the access and mobility management function network element determines that the terminal that has joined the multicast session is in the CM-CONNECTED state, the access and mobility management function network element may indicate the terminal in the CM-CONNECTED state to the first session management function network element, and trigger the first session management function network element to indicate the access network device to release a resource used for transmitting the data of the multicast service to the first terminal, where the resource includes multicast QoS information corresponding to the radio bearer used for transmitting data of the multicast service to the first terminal and/or the multicast service, and/or unicast QoS information corresponding to the multicast QoS information.

Optionally, in a communication system, when a multicast session is activated, a core network device indicates an access network device to configure a radio bearer. In this case, if there are a plurality of terminals, the access network device needs to be indicated, for a plurality of times, to configure radio bearers. Consequently, signaling overheads are increased. To resolve this problem, in this embodiment of this application, an access network may be further triggered to set and learn of multicast session activation, and establish a radio bearer at a granularity of a multicast session, to reduce overheads. In addition, after the access network device activates the multicast session, a core network device is notified of the multicast session activation, to ensure consistency of states of the multicast session. For the method, refer to the embodiment corresponding to FIG. 8.

Figure 8:
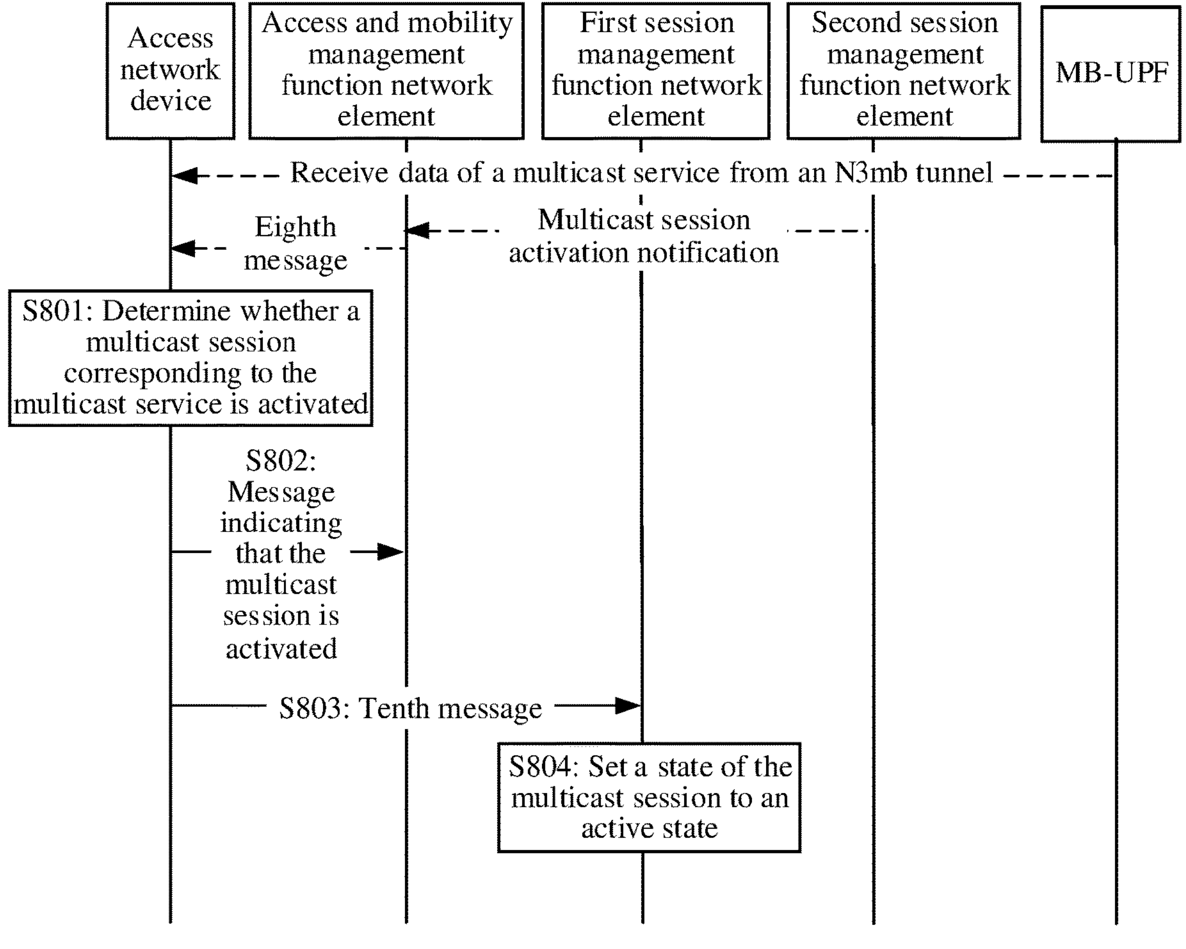
FIG. 8 is a flowchart of a communication method according to an embodiment of this application.

FIG. 8 shows a communication method according to an embodiment of this application. As shown in FIG. 8, the method may include the following steps.

S801: An access network device determines whether a multicast session corresponding to a multicast service is activated.

When S801 is performed, the multicast session is in an inactive state. For related descriptions of the multicast service and the multicast session, refer to the foregoing descriptions. Details are not described again. The access network device may be an access network device that supports a multicast function in the system shown in FIG. 2.

As shown in FIG. 8, in this embodiment of this application, the access network device determines, in a manner 1 or a manner 2, to activate the multicast session.

Manner 1: When the access network device receives data of the multicast service from an MB-UPF, the access network device determines to activate the multicast session corresponding to the multicast service.

In the manner 1: When the multicast session is deactivated, an N3mb tunnel between the MB-UPF corresponding to the multicast session and the access network device is not released. When the access network device receives data from the N3mb tunnel, the access network device may determine, based on a correspondence between tunnel information of the N3mb tunnel and identification information of the multicast session, that the data received from the N3mb tunnel is the data of the multicast service corresponding to the multicast session, to determine to activate the multicast session.

Manner 2: The access network device receives an eighth message from an access and mobility management function network element, where the eighth message may indicate to activate the multicast session, and the eighth message may include the identification information of the multicast session; and the access network device may determine, based on the eighth message, that the multicast session corresponding to the multicast service needs to be activated.

The eighth message may be an N2 message, and the N2 message is a message at a granularity of a node (for example, an access network device), that is, the N2 message is a per node message.

After a second session management function network element receives a multicast session activation (MBS session activation) notification from an AF/AS, an MB SF, or an NEF; or the MB-UPF detects that the data of the multicast service arrives and notifies the second session management function network element that the multicast session is activated, the second session management function network element may determine identification information of the access and mobility management function network element, and send the multicast session activation notification to the access and mobility management function network element based on the identification information of the access and mobility management function network element, where the notification may be an N11 mb message, and the N11 mb message may include the identification information of the multicast session. Optionally, the N11 mb message may further include an indication/notification for preparing/configuring a multicast radio bearer for the multicast session. After receiving the N11 mb message, the access and mobility management function network element sends the eighth message to the access network device.

The access and mobility management function network element may be an AMF that provides a NAS signaling service for a terminal that has joined the multicast session, or may be an AMF that serves the multicast session. In this embodiment of this application, the second session management function network element learns of the identification information of the access and mobility management function network element from a first network element. For example, the second session management function network element may send the identification information of the multicast session to the first network element. The first network element receives the identification information of the multicast session, searches for the access and mobility management function network element that can serve the multicast session, and sends the identification information of the access and mobility management function network element to the second session management function network element. Alternatively, when the multicast session is established, the second session management function network element may store the identification information of the access and mobility management function network element.

The first network element may be an NRF, a UDM, a UDR, or a PCF, or may be another network element that stores the identification information of the access and mobility management function network element. This is not limited. The first network element stores a correspondence between the identification information of the access and mobility management function network element and the identification information of the multicast session.

Further, after the access network device determines that the multicast session corresponding to the multicast service is being activated, the access network device may activate a multicast session resource corresponding to the multicast session. For example, the access network device configures a multicast radio bearer based on multicast QoS information corresponding to the multicast session, and the multicast radio bearer may be used for transmitting the data of the multicast service.

Related descriptions of the multicast QoS information corresponding to the multicast session are described in the embodiment corresponding to FIG. 7. Details are not described again. The multicast QoS information corresponding to the multicast session is not released by the access network device when the multicast session is deactivated, and the multicast QoS information corresponding to the multicast session is retained in the access network device, for example, is retained in a context of the multicast session in the access network device.

S802: The access network device sends a message to an access and mobility management function network element corresponding to a terminal that has joined the multicast session, where the message may indicate that the multicast session is activated, so that the access and mobility management function network element notifies a first session management function network element that the multicast session is activated, to trigger the first session management function network element to set a state of the multicast session to an active state.

The terminal that has joined the multicast session in S802 may be a terminal that has joined the multicast session and that is provided with a network service by the access network device. The terminal that has joined the multicast session and that is provided with the network service by the access network device may include one or more terminals. The access network device may send, to an access and mobility management function network element corresponding to each terminal that has joined the multicast session and that is provided with the network service by the access network device, a message indicating that the multicast session is activated.

For example, the terminal that has joined the multicast session includes the first terminal. The access network device may send a sixth message to an access and mobility management function network element corresponding to the first terminal. Correspondingly, the access and mobility management function network element corresponding to the first terminal receives the sixth message. The sixth message may indicate that the multicast session is activated, and the sixth message may include the identification information of the multicast session. The sixth message may be an N2 message corresponding to the first terminal.

For another example, the terminal that has joined the multicast session further includes a second terminal. The access network device may send a seventh message to an access and mobility management function network element corresponding to the second terminal. Correspondingly, the access and mobility management function network element corresponding to the second terminal receives the seventh message. The seventh message may indicate that the multicast session is activated, and the seventh message may include the identification information of the multicast session. The seventh message may be an N2 message corresponding to the second terminal.

For example, the access network device may find a context of the multicast session by using the identification information of the multicast session as an index, and determine a terminal identified by identification information that is of the terminal and that is included in the context of the multicast session as a terminal that has joined the multicast session and that is provided with the network service by the access network device.

S803: The access and mobility management function network element sends a tenth message to the first session management function network element. Correspondingly, the first session management function network element receives the tenth message from the access and mobility management function network element.

The access and mobility management function network element in S803 may be the access and mobility management function network element corresponding to the first terminal, the first session management function network element may be a session management function network element corresponding to the first terminal, and the first session management function network element may be configured to manage a PDU session that is of the first terminal and that is associated with the multicast session. The first session management function network element stores the context of the multicast session, a context of the PDU session associated with the multicast session, and the like.

The tenth message may indicate that the multicast session is activated or indicate to activate the multicast session, and the tenth message may include the identification information of the multicast session. The tenth message may be an N11 message, and the N11 message may be a PDU session update context request/response (Nsmf_PDUSession_UpdateSMContext Request/Response). Optionally, the tenth message may further include a multicast session activation notification.

For example, the access and mobility management function network element corresponds to the first terminal. After receiving the sixth message, the access and mobility management function network element may learn, based on a correspondence between the sixth message and the first terminal, that the sixth message is a message of the first terminal; determine, based on identification information of the first terminal, a PDU session that is of the first terminal and that is associated with the PDU session; and send the tenth message by using a control plane signaling message that is between the access and mobility management function network element and the first session management function network element and that corresponds to the PDU session.

S804: The first session management function network element sets the state of the multicast session to the active state based on the tenth message.

For example, the first session management function network element may find, based on the identification information that is of the multicast session and that is carried in the tenth message, a context that is of the multicast session and that is stored in the first session management function network element, and switch the state of the multicast session in the context of the multicast session from the inactive state to the active state.

Further, the method shown in FIG. 8 may further include: If there is a multicast-associated PDU session and a state of the PDU session is the inactive state, the first session management function network element activates the PDU session. If there is a multicast-associated PDU session and a state of the PDU session is the inactive state, because the first session management function network element has received the multicast session activation notification, the first session management function network element does not deactivate the associated PDU session.

That the first session management function network element activates the PDU session may include: The first session management function network element sends N1N2 message transfer (Namf_Communication_N1N2Message Transfer) to the access and mobility management function network element. The N1N2 message transfer includes N2 SM information, the N2 SM message includes the identification information of the multicast session, and the N2 SM message may be PDU session resource setup request transfer or PDU session resource modify request transfer. The access and mobility management function network element receives the N1N2 message transfer, and sends an N2 message to the access network device, where the N2 message includes the N2 SM information. The N2 message may be a PDU session resource setup request or a PDU session resource modify request. After receiving the N2 message, the access network device prepares/configures a radio bearer (for example, a DRB) for the PDU session. The access network device returns an N2 message to the access and mobility management function network element. The N2 message may be a PDU session resource setup response or a PDU session resource modify response. The N2 message includes a response, namely, PDU session resource setup response transfer or PDU session resource modify request transfer, to the N2 SM message sent to the first session management function network element. The N2 SM information carries tunnel information (for example, access network tunnel information (AN tunnel Info) of the access network device), and the tunnel information may be notified to a PDU session anchor (PSA) by the first session management function network element, to establish a downlink tunnel between the PSA and the access network device. The PDU session associated with the multicast session is activated.

Based on the method shown in FIG. 8, after the access network device activates the multicast session, the access network device may notify, through the access and mobility management function network element, the first session management function network element to also activate the multicast session, to ensure consistency of states of the multicast session maintained by the network elements. In addition, a core network element does not need to notify, at a granularity of a terminal, the access network device corresponding to the terminal to add the terminal to the multicast session, to reduce signaling overheads.

Further, in the method shown in FIG. 8, if a PDU session associated with the multicast session is in the inactive state, after activating the multicast session, the access network device may further configure, based on unicast QoS information that is in a context of the PDU session and that corresponds to the multicast QoS information corresponding to the multicast session, a unicast radio bearer for a terminal corresponding to the PDU session. The unicast radio bearer may be used for transmitting the data of multicast service to the terminal by using the PDU session.

For related descriptions of the multicast QoS information and the unicast QoS information that correspond to the multicast session, refer to the descriptions in the embodiment corresponding to FIG. 7. Details are not described again. It should be noted that when the PDU session associated with the multicast session is deactivated, the unicast QoS information that is in the context of the PDU session and that corresponds to the multicast QoS information corresponding to the multicast session is not released/not deleted from the access network device, and is still retained on the access network device, so that when the multicast session is activated, the access network device may establish the unicast radio bearer for the terminal based on the unicast QoS information that is the context of the PDU session associated with the multicast session and that corresponds to the multicast QoS information corresponding to the multicast session, to activate the PDU session associated with the multicast session. With reference to the method shown in FIG. 9, when a PDU session associated with a multicast session is deactivated, unicast QoS information corresponding to the PDU session associated with the multicast session is retained on an access network device.

Figure 9:
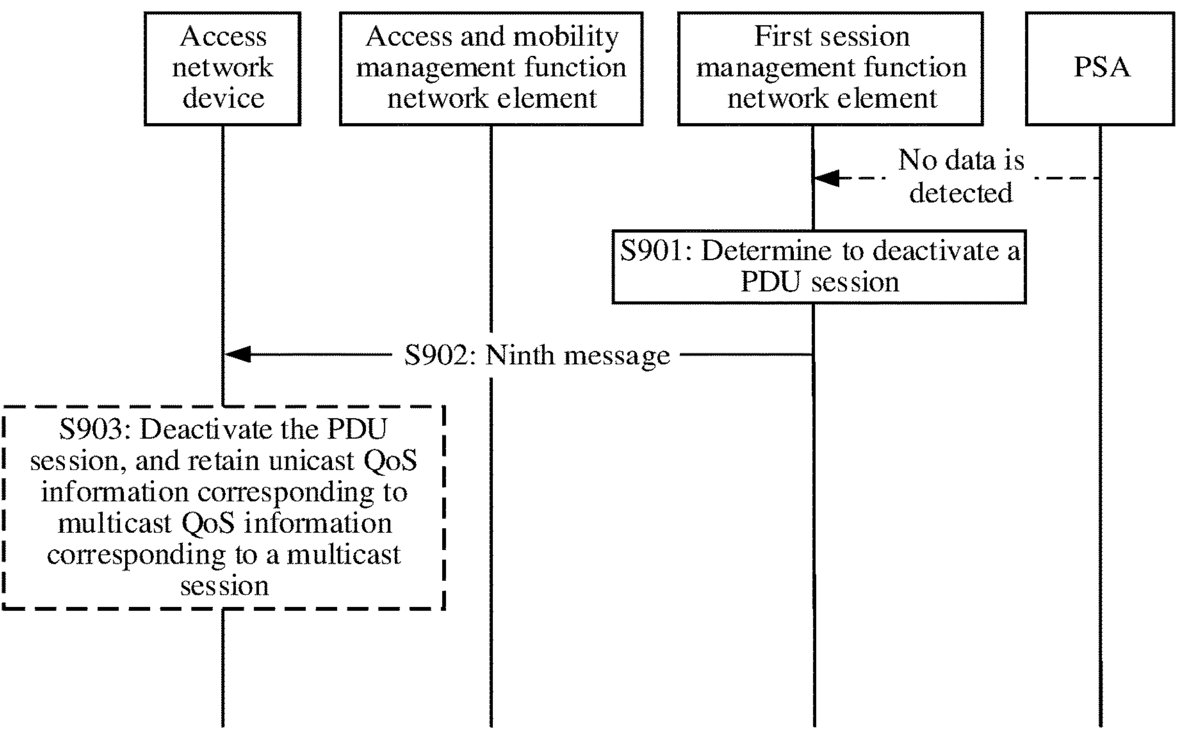
FIG. 9 is a flowchart of a communication method according to an embodiment of this application.

FIG. 9 shows a communication method according to an embodiment of this application. As shown in FIG. 9, the method may include the following steps.

S901: A first session management function network element determines to deactivate a PDU session.

The first session management function network element may be an SMF that manages the PDU session.

For example, when a PSA corresponding to the PDU session detects no data arrival in a period of time, the PSA corresponding to the PDU session may send, to the first session management function network element, a notification indicating that no data transmission is detected. The first session management function network element receives the notification from the PSA, and determines, based on the notification from the PSA, to deactivate the PDU session.

S902: The first session management function network element sends a ninth message to an access network device. Correspondingly, the access network device receives the ninth message from the first session management function network element.

The ninth message may include identification information of the PDU session. The ninth message may indicate to deactivate the PDU session, and may be further used by the access network device to retain unicast QoS information that corresponds to multicast QoS information corresponding to a multicast session and that is of the PDU session. Optionally, if the PDU session is associated with the multicast session, the ninth message may further include identification information of the multicast session and/or fourth indication information, and the fourth indication information may indicate to retain the unicast QoS information corresponding to the multicast QoS information corresponding to the multicast session.

That the PDU session is associated with the multicast session may include one or more of the following: The identification information of the multicast session is stored in a context of the PDU session (for example, a session management context (SM context) of the PDU session), or the identification information of the PDU session (for example, an SM context ID of the PDU session), or identification information of a terminal corresponding to the PDU session is stored in a context of the multicast session (for example, an MBS session context).

For example, that the first session management function network element sends a ninth message to an access network device may include: The first session management function network element includes the ninth message in N1N2 message transfer (Namf_Communication_N1N2Message Transfer) corresponding to the PDU session, and sends the N1N2 message transfer to an access and mobility management function network element; and the access and mobility management function network element receives the N1N2 message transfer, obtains the ninth message from the N1N2 message transfer, includes the ninth message in an N2 message, and sends the N2 message to the access network device corresponding to the PDU session, where the N2 message may be a PDU session resource release command/request transfer

S903: The access network device retains, based on the ninth message, the unicast QoS information corresponding to the multicast QoS information corresponding to the multicast session in the context of the PDU session.

In an example, the ninth message includes the identification information of the PDU session, the identification information of the multicast session, and/or the fourth indication information. The access network device may determine, based on the identification information of the PDU session that is carried in the ninth message, to deactivate the PDU session, and retain/not release, based on the identification information of the multicast session and/or the fourth indication information that are/is carried in the ninth message, the unicast QoS information corresponding to the multicast QoS information corresponding to the multicast session. Optionally, the access network device may further retain/not release the identification information of the PDU session (for example, an ID of the PDU session).

In another example, the ninth message includes the identification information of the PDU session. The access network device may determine, based on the identification information of the PDU session that is carried in the ninth message, to deactivate the PDU session. In this case, the access network device determines whether the PDU session is associated with the multicast session. If the PDU session is associated with the multicast session, the access network device retains/does not release the unicast QoS information corresponding to the multicast QoS information corresponding to the multicast session. Optionally, the access network device may further retain/not release the identification information of the PDU session (for example, an ID of the PDU session).

In this embodiment of this application, for an access network device that supports a multicast function, the access network device stores a context of the multicast session (for example, the MBS session context). Optionally, the access network device further stores a context (for example, an NGAP UE context) of a terminal that has joined the multicast session (note: the NGAP UE context is different from a UE context in the access and mobility management function network element). The NGAP UE context in the access network device includes contexts of all PDU sessions of the terminal. For a PDU session used for that has joined the multicast session, the context of the PDU session stores the identification information of the multicast session. The access network device may determine, by viewing whether the context of the PDU session includes an identifier of the multicast session, whether the PDU session is associated with the multicast session.

Based on the method shown in FIG. 9, when the PDU session associated with the multicast session is deactivated, the unicast QoS information corresponding to the multicast QoS information on the access network device may not be released, so that when the multicast session is activated, the access network device may establish a unicast radio bearer based on the unicast QoS information corresponding to the PDU session associated with the multicast session, and activate the PDU session associated with the multicast session, to ensure normal transmission of data of a multicast service.

The foregoing mainly describes the solutions provided in embodiments of this application from the perspective of interaction between the nodes. It can be understood that to implement the foregoing functions, each node, for example, each of the access and mobility management function network element and the first session management function network element includes a corresponding hardware structure and/or software module for implementing each function. A person skilled in the art should be easily aware that, with reference to the algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the access and mobility management function network element and the first session management function network element may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, division into the modules is an example, and is merely logical function division. In an actual implementation, another division manner may be used.

Figure 10:
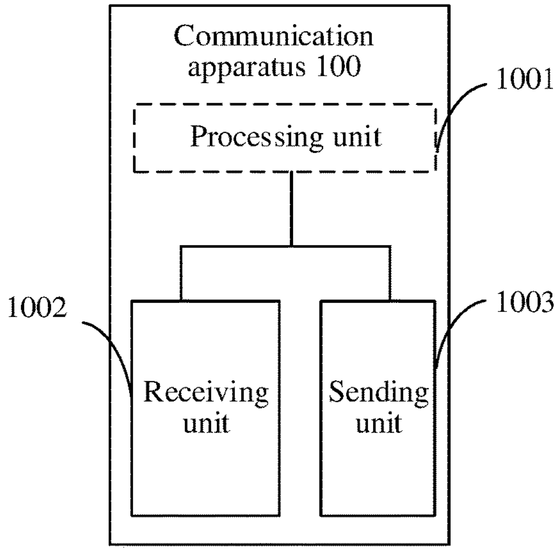
FIG. 10 is a diagram of a communication apparatus 100 according to an embodiment of this application.

FIG. 10 is a diagram of a structure of a communication apparatus 100. The communication apparatus 100 may be a first session management function network element, a chip or a system-on-a-chip in the first session management function network element, another apparatus that can implement a function of the first session management function network element in the foregoing method, or the like. The communication apparatus 100 may be configured to perform the function of the first session management function network element in the foregoing method embodiments. In a feasible implementation, the communication apparatus 100 shown in FIG. 10 includes a receiving unit 1002 and a sending unit 1003. The apparatus may further include a processing unit 1001.

In a design, the receiving unit 1002 is configured to receive a first message from a second session management function network element, where the second session management function network element corresponds to a multicast session, and the first message notifies that the multicast session is activated or notifies that the multicast session is released. For example, the receiving unit 1002 may support the communication apparatus 100 in performing S502.

The sending unit 1003 is configured to send first information to an access and mobility management function network element based on the first message, where the first information includes identification information of the multicast session and/or indication information, and the indication information indicates group paging. For example, the sending unit 1003 is configured to support the communication apparatus 100 in performing S504.

In another design, the sending unit 1003 is configured to send a second message to an access and mobility management function network element, where the second message is used by the access and mobility management function network element to indicate a terminal in a CM-CONNECTED state to the communication apparatus. For example, the sending unit 1003 may support the communication apparatus 100 in performing S601 and S703.

The receiving unit 1002 is configured to receive a third message from the access and mobility management function network element, where the third message includes identification information of a first terminal and/or identification information of a multicast session, the communication apparatus is configured to manage a protocol data unit PDU session that is in one or more PDU sessions of the first terminal and that is associated with the multicast session, and the terminal in the CM-CONNECTED state includes the first terminal. For example, the receiving unit 1002 may support the communication apparatus 100 in performing S602 and S706.

In still another design, the receiving unit 1002 is configured to receive a tenth message from an access and mobility management function network element, where the tenth message indicates that a multicast session is activated, and the tenth message includes identification information of the multicast session; and For example, the receiving unit 1002 is configured to support the communication apparatus 100 in performing S803.

The processing unit 1001 is configured to set a state of the multicast session to an active state based on the tenth message. For example, the processing unit 1001 is configured to support the communication apparatus 100 in performing S804.

All related content of the steps in the foregoing method embodiments shown in FIG. 5 to FIG. 9 may be cited in function descriptions of the corresponding functional modules. Details are not described herein again. The communication apparatus 100 is configured to perform the function of the first session management function network element in the communication methods shown in FIG. 5 to FIG. 9, and therefore can achieve same effects as the foregoing communication methods.

In another feasible implementation, the communication apparatus 100 shown in FIG. 10 includes a processing module and a communication module. The processing module is configured to control and manage an action of the communication apparatus 100. For example, the processing module may integrate a function of the processing unit 1001 to perform S804 and another control function. The communication module may integrate functions of the sending unit 1003 and the receiving unit 1002, to perform S502, S504, S803, and S804, and communicate with another network entity, for example, communicate with the functional module or network entity shown in FIG. 2, FIG. 3*a*, or FIG. 3*b*. Further, the communication apparatus 100 may further include a storage module, configured to store instructions and/or data. When the instructions are executed by the processing module, the processing module is enabled to implement the foregoing method on the first session management network side.

The processing module may be a processor, a controller, a module, or a circuit. The processing module may implement or execute various example logical blocks described with reference to content disclosed in embodiments of this application. The communication module may be a transceiver circuit, a pin, an interface circuit, a bus interface, a communication interface, or the like. The storage module may be a memory. When the processing module is a processor, the communication module is a communication interface, and the storage module is a memory, the communication apparatus 100 in this embodiment of this application may be the communication apparatus 400 shown in FIG. 4.

FIG. 11 is a diagram of a structure of a communication apparatus 110. The communication apparatus 110 may be an access and mobility management function network element, a chip or a system-on-a-chip in the access and mobility management function network element, another apparatus that can implement a function of the access and mobility management function network element in the foregoing method, or the like. The communication apparatus 110 may be configured to perform the function of the access and mobility management function network element in the foregoing method embodiments. In a feasible implementation, the communication apparatus 110 shown in FIG. 11 includes a processing unit 1101, a receiving unit 1102, and a sending unit 1103.

In a design, the receiving unit 1102 is configured to receive first information from a first session management function network element, where the first information includes identification information of a multicast session and/or indication information, and the indication information indicates group paging; and For example, the receiving unit 1102 is configured to support the communication apparatus 110 in performing S504.

The processing unit 1101 is configured to perform group paging based on the first information. For example, the processing unit 1101 is configured to support the communication apparatus 110 in performing S505.

In another design, the receiving unit 1102 is configured to receive a second message from a first session management function network element, where the second message is used by the communication apparatus to indicate a terminal in a CM-CONNECTED state to the first session management function network element; and For example, the receiving unit 1102 may support the communication apparatus 110 in performing S601 and S703.

The sending unit 1103 is configured to send a third message to the first session management function network element based on the second message, where the third message includes identification information of a first terminal and/or identification information of a multicast session, the first session management function network element is configured to manage a protocol data unit PDU session that is in one or more PDU sessions of the first terminal and that is associated with the multicast session, and the terminal in the CM-CONNECTED state includes the first terminal. For example, the sending unit 1103 may support the communication apparatus 110 in performing S602, S706 and S707.

In still another design, the receiving unit 1102 is configured to receive a sixth message from an access network device, where the sixth message indicates that a multicast session is activated, and the sixth message includes identification information of the multicast session. For example, the receiving unit 1102 is configured to support the communication apparatus 110 in performing S802.

The sending unit 1103 is configured to send a tenth message to a first session management function network element based on the sixth message, where the tenth message indicates that the multicast session is activated, and the tenth message includes the identification information of the multicast session. For example, the sending unit 1103 may support the communication apparatus 110 in performing S803.

All related content of the steps in the foregoing method embodiments shown in FIG. 5 to FIG. 9 may be cited in function descriptions of the corresponding functional modules. Details are not described herein again. The communication apparatus 110 is configured to perform the function of the access and mobility management function network element in the communication methods shown in FIG. 5 to FIG. 9, and therefore can achieve same effects as the foregoing communication methods.

In another feasible implementation, the communication apparatus 110 shown in FIG. 11 includes a processing module and a communication module. The processing module is configured to control and manage an action of the communication apparatus 110. For example, the processing module may integrate a function of the processing unit 1101, and may be configured to support the communication apparatus 110 in performing S505 and another step. The communication module may integrate functions of the sending unit 1103 and the receiving unit 1102, for example, perform S504, S601, S703, S602, S706, S707, S802, S803, and the like, and communicate with another network entity, for example, communicate with the functional module or network entity shown in FIG. 2, FIG. 3*a*, or FIG. 3*b*. Further, the communication apparatus 110 may further include a storage module, configured to store instructions and/or data. When the instructions are executed by the processing module, the processing module is enabled to implement the foregoing method on the access and mobility management function network element side.

The processing module may be a processor, a controller, a module, or a circuit. The processing module may implement or execute various example logical blocks described with reference to content disclosed in embodiments of this application. The communication module may be a transceiver circuit, a pin, an interface circuit, a bus interface, a communication interface, or the like. The storage module may be a memory. When the processing module is a processor, the communication module is a communication interface, and the storage module is a memory, the communication apparatus 110 in this embodiment of this application may be the communication apparatus 400 shown in FIG. 4.

FIG. 12 is a diagram of a structure of a communication apparatus 120. The communication apparatus 120 may be an access network device, a chip or a system-on-a-chip in the access network device, another apparatus that can implement a function of the access network device in the foregoing method, or the like. The communication apparatus 120 may be configured to perform the function of the access network device in the foregoing method embodiments. In a feasible implementation, the communication apparatus 120 shown in FIG. 12 includes a processing unit 1201 and a sending unit 1202.

The processing unit 1201 is configured to determine that a multicast session corresponding to a multicast service is activated. For example, the processing unit 1201 may support the communication apparatus 120 in performing S801.

The sending unit 1202 is configured to send a sixth message to an access network device corresponding to a first terminal, where the sixth message indicates that the multicast session is activated, the sixth message includes identification information of the multicast session, and the first terminal is a terminal that has joined the multicast session. For example, the sending unit 1202 may support the communication apparatus 120 in performing S802.

All related content of the steps in the foregoing method embodiments shown in FIG. 5 to FIG. 9 may be cited in function descriptions of the corresponding functional modules. Details are not described herein again. The communication apparatus 120 is configured to perform the function of the access network device in the communication methods shown in FIG. 5 to FIG. 9, and therefore can achieve same effects as the foregoing communication methods.

In another feasible implementation, the communication apparatus 120 shown in FIG. 12 includes a processing module and a communication module. The processing module is configured to control and manage an action of the communication apparatus 120. For example, the processing module may integrate a function of the processing unit 1201, and may be configured to support the communication apparatus 120 in performing S801 and another step. The communication module may integrate a function of the sending unit 1202, for example, perform S802 and communicate with another network entity, for example, communicate with the functional module or network entity shown in FIG. 2, FIG. 3*a*, or FIG. 3*b*. Further, the communication apparatus 120 may further include a storage module, configured to store instructions and/or data. When the instructions are executed by the processing module, the processing module is enabled to implement the foregoing method on the access network device side.

The processing module may be a processor, a controller, a module, or a circuit. The processing module may implement or execute various example logical blocks described with reference to content disclosed in embodiments of this application. The communication module may be a transceiver circuit, a pin, an interface circuit, a bus interface, a communication interface, or the like. The storage module may be a memory. When the processing module is a processor, the communication module is a communication interface, and the storage module is a memory, the communication apparatus 120 in this embodiment of this application may be the communication apparatus 400 shown in FIG. 4.

In embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by a combination of hardware in the processor and a software module.

In embodiments of this application, the memory may be a non-volatile memory, such as a hard disk drive (HDD) or a solid-state drive (SSD), or may be a volatile memory, such as a random access memory (RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store instructions and/or data.

FIG. 13 is a diagram of a structure of a communication system according to an embodiment of this application. As shown in FIG. 13, the communication system may include an access and mobility management function network element 130 and a first session management function network element 131. It should be noted that FIG. 13 is merely an example of an accompanying drawing. Network elements and a quantity of the network elements included in the communication system shown in FIG. 13 are not limited in this embodiment of this application. For example, FIG. 13 may further include an access network device, a terminal, a second session management function network element, a UPF, an MB-UPF, and the like.

The access and mobility management function network element 130 has a function of the access and mobility management function network element in one or more of the methods shown in FIG. 5 to FIG. 9. The first session management function network element 131 has a function of the first session management function network element in one or more of the methods shown in FIG. 5 to FIG. 9.

In embodiments of this application, "/" may represent an "or" relationship between associated objects. For example, A/B may represent A or B. "And/or" may indicate that there are three relationships between associated objects. For example, A and/or B may represent the following three cases: Only A exists, both A and B exist, and only B exists. A and B may be singular or plural. To facilitate descriptions of the technical solutions in embodiments of this application, in embodiments of this application, terms such as "first" and "second" may be used to distinguish between technical features having same or similar functions. The terms such as "first" and "second" do not limit a quantity and an execution sequence, and the terms such as "first" and "second" do not indicate a definite difference. In embodiments of this application, the term such as "example" or "for example" is used to represent an example, an illustration, or a description. Any embodiment or design scheme described with "example" or "for example" should not be explained as being more preferred or having more advantages than another embodiment or design scheme. Use of the term such as "example" or "for example" is intended to present a related concept in a specific manner for ease of understanding.

In embodiments of this application, "first", "second", "third", "A", "B", "C", "D", and the like are used for distinguishing between technical features described by them. There is no chronological order or no size order between the technical features described by "first", "second", "third", "A", "B", "C", and "D".

It should be understood that in the embodiments of this application, "B corresponding to A" indicates that B is associated with A. For example, B may be determined based on A. It should be further understood that determining B based on A does not mean that B is determined based only on A. B may alternatively be determined based on A and/or other information. In addition, in embodiments of this application, "connection" means various connection manners such as a direct connection or an indirect connection, for implementing communication between devices. This is not limited in embodiments of this application.

In embodiments of this application, unless otherwise specified, "transmission" (transmit/transmission) refers to bidirectional transmission, and includes a sending action and/or a receiving action. The "transmission" in embodiments of this application includes data sending, data receiving, or data sending and data receiving. In other words, data transmission herein includes uplink data transmission and/or downlink data transmission. Data may include a channel and/or a signal. The uplink data transmission is uplink channel transmission and/or uplink signal transmission, and the downlink data transmission is downlink channel transmission and/or downlink signal transmission. In embodiments of this application, a "network" and a "system" express a same concept, and a communication system is a communication network.

Module division in embodiments of this application is an example and is merely logical function division, and may be other division during actual implementation. In addition, functional modules in embodiments of this application may be integrated into one processor or may exist alone physically, or two or more modules may be integrated into one module. The integrated module may be implemented in a form of hardware, or may be implemented in a form of a software functional module.

All or a part of the technical solutions provided in embodiments of this application may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, a wireless control apparatus, an access network device, a terminal, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium, or the like.

In embodiments of this application, when there is no logical conflict, embodiments may be mutually referenced. For example, methods and/or terms in the method embodiments may be mutually referenced, and functions and/or terms in the apparatus embodiments may be mutually referenced. For example, functions and/or terms between the apparatus embodiments and the method embodiments may be mutually referenced.

The foregoing descriptions are merely implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

The invention claimed is:

1. A communication method, comprising:

receiving, by an access and mobility management function network element, a second message from a first session management function network element, the second message being used for the access and mobility management function network element indicating a terminal in a connection management-connected (CM-CONNECTED) state to the first session management function network element; and sending, by the access and mobility management function network element, a third message to the first session management function network element based on the second message, the third message comprising first terminal identification information of a first terminal, the first session management function network element is configured to manage a protocol data unit (PDU) session that is in one or more PDU sessions of the first terminal and that is associated with a multicast session, and the terminal in the CM-CONNECTED state comprises the first terminal.

2. The method according to claim 1, wherein the second message comprises multicast session identification information of the multicast session and a UE identifier list (UE ID list) including identification information of one or more terminals that have joined the multicast session.

3. The method according to claim 1, wherein the second message is further used for paging a terminal that has joined the multicast session and is in a connection management-idle (CM-IDLE) state.

4. The method according to claim 3, wherein the method further comprises:

determining, by the access and mobility management function network element, the terminal that has joined the multicast session and is in the CM-IDLE state based on the second message; and sending, by the access and mobility management function network element, a paging message in a paging area of the terminal that has joined the multicast session and is in the CM-IDLE state, wherein the paging message comprises the multicast session identification information of the multicast session, the paging area of the terminal that has joined the multicast session and is in the CM-IDLE state comprises an access network device that supports a multicast capability, and the terminal that has joined the multicast session and is in the CM-IDLE state comprises the first terminal.

5. The method according to claim 1, wherein the sending, by the access and mobility management function network element, the third message to the first session management function network element based on the second message comprises:

if there is a terminal that has joined the multicast session and is in the CM-IDLE state, paging, by the access and mobility management function network element, the terminal that has joined the multicast session and is in the CM-IDLE state based on the second message, wherein the terminal that has joined the multicast session and is in the CM-IDLE state comprises the first terminal;

receiving, by the access and mobility management function network element, a service request from the first terminal; and sending, by the access and mobility management function network element, the third message to the first session management function network element.

6. The method according to claim 5, wherein the paging, by the access and mobility management function network element, the terminal that has joined the multicast session and is in the CM-IDLE state based on the second message comprises:

paging, by the access and mobility management function network element, the terminal that has joined the multicast session and is in the CM-IDLE state based on the second message and multicast capability information of an access network device in a registration area of the terminal that has joined the multicast session and is in the CM-IDLE state.

7. The method according to claim 6, wherein the paging, by the access and mobility management function network element, the terminal in the CM-IDLE state based on the second message and multicast capability information of the access network device in the registration area of the terminal that has joined the multicast session and is in the CM-IDLE state comprises:

if a first access network device in a registration area of the first terminal supports a multicast function, sending, by the access and mobility management function network element, a paging message to the first access network device, the paging message comprising the multicast session identification information of the multicast session.

8. The method according to claim 1, wherein the method further comprises:

if there is a terminal that has joined the multicast session and is in the CM-CONNECTED state, sending, by the access and mobility management function network element, the third message to the first session management function network element based on the second message, wherein the terminal that has joined the multicast session and is in the CM-CONNECTED state comprises the first terminal.

9. A communication method, comprising:

sending, by a first session management function network element, a second message to an access and mobility management function network element, the second message being used for the access and mobility management function network element indicating a terminal in a connection management-connected (CM-CONNECTED) state to the first session management function network element; and receiving, by the first session management function network element, a third message from the access and mobility management function network element, the third message comprising first terminal identification information of a first terminal, the first session management function network element is configured to manage a protocol data unit (PDU) session that is in one or more PDU sessions of the first terminal and that is associated with a multicast session, and the terminal in the CM-CONNECTED state comprises the first terminal.

10. The method according to claim 9, wherein the method further comprises:

receiving, by the first session management function network element, a first message from a second session management function network element, wherein the second session management function network element corresponds to the multicast session, and the first message notifies that the multicast session is activated; and the sending, by the first session management function network element, the second message to the access and mobility management function network element comprises: sending, by the first session management function network element, the second message to the access and mobility management function network element based on the first message.

11. The method according to claim 9, wherein the second message comprises multicast session identification information of the multicast session and a UE identifier list (UE ID list) including identification information of one or more terminals that have joined the multicast session.

12. The method according to claim 9, wherein the second message is further used for paging a terminal that has joined the multicast session and is in a connection management-idle (CM-IDLE) state.

13. The method according to claim 9, wherein the method further comprises:

sending, by the first session management function network element based on the third message, second information to an access network device corresponding to the first terminal, wherein the second information is used by the access network device to configure a radio bearer used for transmitting data of a multicast service to the first terminal.

14. The method according to claim 13, wherein the second information is used by the access network device to configure the radio bearer used for transmitting the data of the multicast service to the first terminal; and the second information comprises at least one of: the multicast session identification information of the multicast session, or unicast quality of service (QoS) information corresponding to the multicast QoS information.

15. A communication system, comprising:

a first session management function network element; and an access and mobility management function network element;

the first session management function network element is configured to send a second message to the access and mobility management function network element, the second message being used for the access and mobility management function network element indicating a terminal in a connection management-connected (CM-CONNECTED) state to the first session management function network element;

the access and mobility management function network element is configured to receive the second message and send a third message to the first session management function network element based on the second message, the third message comprising first terminal identification information of a first terminal, the first session management function network element being configured to manage a protocol data unit (PDU) session that is in one or more PDU sessions of the first terminal and that is associated with a multicast session, and the terminal in the CM-CONNECTED state comprises the first terminal; and the first session management function network element is further configured to receive the third message.

16. The communication system according to claim 15, wherein the second message comprises multicast session identification information of the multicast session and a UE identifier list (UE ID list) including identification information of one or more terminals that have joined the multicast session.

17. The communication system according to claim 15, wherein the second message is further used for paging a terminal that has joined the multicast session and is in a connection management-idle (CM-IDLE) state.

18. The communication system according to claim 15, wherein the access and mobility management function network element is further configured to:

if there is a terminal that has joined the multicast session and is in the CM-IDLE state, page the terminal that has joined the multicast session and is in the CM-IDLE state based on the second message, wherein the terminal that has joined the multicast session and is in the CM-IDLE state comprises the first terminal; and receive a service request from the first terminal.

19. The communication system according to claim 15, wherein the access and mobility management function network element is further configured to:

receive the second message; and if there is a terminal that has joined the multicast session and is in the CM-CONNECTED state, send the third message to the first session management function network element based on the second message, wherein the terminal that has joined the multicast session and is in the CM-CONNECTED state comprises the first terminal.

20. The communication system according to claim 15, wherein the first session management function network element is further configured to:

send, based on the third message, second information to an access network device corresponding to the first terminal, wherein the second information is used by the access network device to configure a radio bearer used for transmitting data of a multicast service to the first terminal.

* * * * *